(12) United States Patent
Busacca et al.

(10) Patent No.: US 12,355,088 B2
(45) Date of Patent: Jul. 8, 2025

(54) PROTECTION LAYER FOR ELECTROCHEMICAL BATTERIES AND SYSTEMS AND METHODS THEREFOR

(71) Applicant: Enovix Corporation, Fremont, CA (US)

(72) Inventors: Robert S. Busacca, Oakland, CA (US); Aditya Mandalam, San Jose, CA (US); Robert K. Rosen, Lincoln, CA (US); Bruno A. Valdes, Sunnyvale, CA (US); Robert F. Kinchen, Fremont, CA (US)

(73) Assignee: Enovix Corporation, Fremont, CA (US)

( * ) Notice: Subject to any disclaimer, the term of this patent is extended or adjusted under 35 U.S.C. 154(b) by 461 days.

(21) Appl. No.: 17/705,512

(22) Filed: Mar. 28, 2022

(65) Prior Publication Data
US 2022/0320639 A1 Oct. 6, 2022

Related U.S. Application Data

(60) Provisional application No. 63/168,392, filed on Mar. 31, 2021.

(51) Int. Cl.
*H01M 50/121* (2021.01)
*H01M 10/04* (2006.01)
(Continued)

(52) U.S. Cl.
CPC ... *H01M 50/1245* (2021.01); *H01M 10/0468* (2013.01); *H01M 50/103* (2021.01); *H01M 50/119* (2021.01); *H01M 50/121* (2021.01)

(58) Field of Classification Search
CPC ........... H01M 50/1245; H01M 50/121; H01M 50/119; H01M 50/103; H01M 10/0468
See application file for complete search history.

(56) References Cited

U.S. PATENT DOCUMENTS 4,396,689 A 8/1983 Grimes
6,096,456 A 8/2000 Takeuchi
(Continued)

FOREIGN PATENT DOCUMENTS

EP 1270765 B1 1/2007
EP 2858162 A1 4/2015
(Continued)

OTHER PUBLICATIONS

International Search Report and Written Opinion issued for PCT/US2022/022176 dated Sep. 12, 2022 (15 pages).
(Continued)

*Primary Examiner* — Jonathan G Jelsma
(74) *Attorney, Agent, or Firm* — Haley Guiliano LLP; Ronit Buller

(57) ABSTRACT

A secondary battery assembly includes an electrode assembly having mutually perpendicular transverse, longitudinal, and vertical axes corresponding to X, Y and Z axes, respectively. A constraint is disposed on an outer surface of the electrode assembly. At least one of the electrode assembly or constraint has a protrusion extending in an X-Y plane defined by the X and Y axes and having a first radius of curvature in the X-Y plane. A battery enclosure encloses the electrode assembly and the constraint. An enclosure protection layer is disposed over at least a portion of the protrusion and between the protrusion and the battery enclosure. The enclosure protection layer defines a second radius of curvature overlying the first radius of curvature in the X-Y plane. The second radius of curvature is greater than the first radius of curvature to thereby reduce the potential of the protrusion causing damage to the battery enclosure.

25 Claims, 13 Drawing Sheets

(51) Int. Cl.
  *H01M 50/103* (2021.01)
  *H01M 50/119* (2021.01)
  *H01M 50/124* (2021.01)

(56) References Cited

U.S. PATENT DOCUMENTS

| | | | |
|---|---|---|---|
| 6,383,234 | B1 | 5/2002 | Noh |
| 7,722,984 | B2 | 5/2010 | Kim |
| 8,865,345 | B1 | 10/2014 | Ramasubramanian |
| 9,660,230 | B2 | 5/2017 | Noh |
| 9,660,292 | B2 | 5/2017 | Rust, III |
| 10,158,108 | B2 | 12/2018 | Narita |
| 10,256,507 | B1 * | 4/2019 | Busacca ............. H01M 50/531 |
| 11,264,680 | B2 | 3/2022 | Busacca |
| 2011/0159328 | A1 | 6/2011 | Yeo |
| 2015/0162589 | A1 | 6/2015 | Kesper |
| 2016/0111701 | A1 | 4/2016 | Schumann |
| 2018/0261806 | A1 | 9/2018 | Kawate et al. |
| 2020/0212493 | A1 | 7/2020 | Busacca et al. |
| 2020/0350633 | A1 | 11/2020 | Busacca |
| 2021/0043881 | A1 | 2/2021 | Wang |
| 2021/0351480 | A1 * | 11/2021 | Tang ................... H01M 50/507 |
| 2022/0069421 | A1 | 3/2022 | Dalton |
| 2022/0115711 | A1 | 4/2022 | Busacca |
| 2022/0320639 | A1 | 10/2022 | Busacca |
| 2022/0320694 | A1 | 10/2022 | Busacca |

FOREIGN PATENT DOCUMENTS

| | | |
|---|---|---|
| EP | 2223367 B1 | 6/2015 |
| EP | 3367468 A1 | 8/2018 |
| EP | 3709392 A1 | 9/2020 |
| EP | 4002536 A1 | 5/2022 |
| EP | 4002537 A1 | 5/2022 |
| JP | 2005347195 A | 12/2005 |
| JP | 2008016193 A | 1/2008 |
| JP | 2016085976 A | 5/2016 |
| KR | 102102101 B1 | 4/2020 |
| WO | 2013112135 A1 | 8/2013 |
| WO | 2018020906 A1 | 2/2018 |
| WO | 2019089492 A1 | 5/2019 |
| WO | 2020066254 A1 | 4/2020 |
| WO | 2022108954 A1 | 5/2022 |
| WO | 2022109019 A1 | 5/2022 |
| WO | 2022221056 A2 | 10/2022 |

OTHER PUBLICATIONS

International Search Report and Written Opinion issued for PCT/US2022/033222 dated Oct. 7, 2022 (15 pages).
Extended European Search Report issued for EP 21208848.8 dated Apr. 22, 2022 (8 pages).
Extended European Search Report issued for EP 21208850.4 dated Apr. 20, 2022 (8 pages).
International Search Report and Written Opinion issued for PCT/US2022/022087 dated Jul. 26, 2022 (15 pages).

* cited by examiner

PROTECTION LAYER FOR ELECTROCHEMICAL BATTERIES AND SYSTEMS AND METHODS THEREFOR

CROSS-REFERENCE TO RELATED APPLICATION

This application claims priority to U.S. Provisional Patent Application No. 63/168,392, filed Mar. 31, 2021, which is hereby incorporated by reference in its entirety.

FIELD

The field of the disclosure relates generally to energy storage technology, such as battery technology. More specifically, the field of the disclosure relates to protection layers, systems and methods for battery components, such as components of electrochemical batteries, e.g., lithium based secondary batteries.

BACKGROUND

Lithium based secondary batteries have become desirable energy sources due to their comparatively high energy density, power and shelf life. Examples of lithium secondary batteries include non-aqueous batteries such as lithium-ion and lithium-polymer batteries.

Known energy storage devices, such as batteries, fuel cells and electrochemical capacitors, typically have two-dimensional laminar architectures, such as planar or spirally wound (i.e., jellyroll) laminate structures, where a surface area of each laminate is approximately equal to its geometric footprint (ignoring porosity and surface roughness).

Three-dimensional secondary batteries may provide increased capacity and longevity compared to laminar secondary batteries. The production of such three-dimensional secondary batteries, however, presents manufacturing and cost challenges.

During the manufacturing process of secondary batteries, sharp edges, corners or other features may create areas that are prone to damage, which may compromise the functionality, safety or output of the battery. Thus, it would be desirable to produce three-dimensional batteries while addressing the issues in the known art.

BRIEF DESCRIPTION

In one embodiment, a secondary battery assembly comprises an electrode assembly having mutually perpendicular transverse, longitudinal, and vertical axes corresponding to the X, Y and Z axes, respectively, of a three-dimensional Cartesian coordinate system; a constraint disposed on an outer surface of the electrode assembly; at least one of the electrode assembly or constraint comprising a protrusion extending in an X-Y plane defined by the X and Y axes, the protrusion having a first radius of curvature in the X-Y plane; a battery enclosure enclosing the electrode assembly and constraint; and an enclosure protection layer disposed over at least a portion of the protrusion and between the protrusion and the battery enclosure, the enclosure protection layer defining a second radius of curvature overlying the first radius of curvature in the X-Y plane, the second radius of curvature being greater than the first radius of curvature to thereby reduce the potential of the protrusion causing damage to the battery enclosure.

In yet another embodiment, a secondary battery comprises an electrode assembly having mutually perpendicular transverse, longitudinal, and vertical axes corresponding to the X, Y and Z axes, respectively, of a three-dimensional Cartesian coordinate system; a constraint defining a volume, the electrode assembly contained within the volume; at least one of the electrode assembly or constraint defining at least one protrusion extending in an X-Y plane defined by the X and Y axes, the protrusion having a first radius of curvature in the X-Y plane; an enclosure protection layer disposed over at least a portion of the protrusion and between the protrusion and a battery enclosure, the enclosure protection layer defining a second radius of curvature overlying the first radius of curvature in the X-Y plane, the second radius of curvature being greater than the first radius of curvature to thereby reduce the potential of the protrusion causing damage to the battery enclosure; and wherein the battery enclosure encloses the electrode assembly, constraint and enclosure protection layer, and at least a portion of the battery enclosure is in direct contact with the enclosure protection layer.

In yet another embodiment, a method of preparing a battery assembly for use with a secondary battery comprises: preparing an electrode assembly having mutually perpendicular transverse, longitudinal, and vertical axes corresponding to the X, Y and Z axes, respectively, of a three-dimensional Cartesian coordinate system; placing the electrode assembly within a volume defined by a constraint, such that the constraint is disposed over an outer surface of the electrode assembly; wherein at least one of the electrode assembly or constraint define at least one protrusion extending in an X-Y plane defined by the X and Y axes, the protrusion having a first radius of curvature in the X-Y plane; adhering an enclosure protection layer over at least a portion of the protrusion, the enclosure protection layer defining a second radius of curvature overlying the first radius of curvature in the X-Y plane, the second radius of curvature being greater than the first radius of curvature to thereby reduce the potential of the protrusion causing damage to a battery enclosure; and enclosing the electrode assembly, constraint and enclosure protection layer within the battery enclosure, such that the enclosure protection layer is disposed between the constraint and the battery enclosure.

In still another embodiment, a method of manufacturing a secondary battery comprises: preparing an electrode assembly having mutually perpendicular transverse, longitudinal, and vertical axes corresponding to the X, Y and Z axes, respectively, of a three-dimensional Cartesian coordinate system; placing the electrode assembly within a volume defined by a constraint, such that the constraint is disposed over an outer surface of the electrode assembly; wherein at least one of the electrode assembly or the constraint define at least one protrusion extending in an X-Y plane defined by the X and Y axes, the protrusion having a first radius of curvature in the X-Y plane; adhering an enclosure protection layer over at least a portion of the at least one protrusion, the enclosure protection layer defining a second radius of curvature overlying the first radius of curvature in the X-Y plane, the second radius of curvature being greater than the first radius of curvature to thereby reduce the potential of the protrusion causing damage to a battery enclosure; enclosing the electrode assembly, constraint and enclosure protection layer within the battery enclosure, such that the enclosure protection layer is disposed between the constraint and the battery enclosure; and vacuum sealing the battery enclosure.

DEFINITIONS

Figure 1:
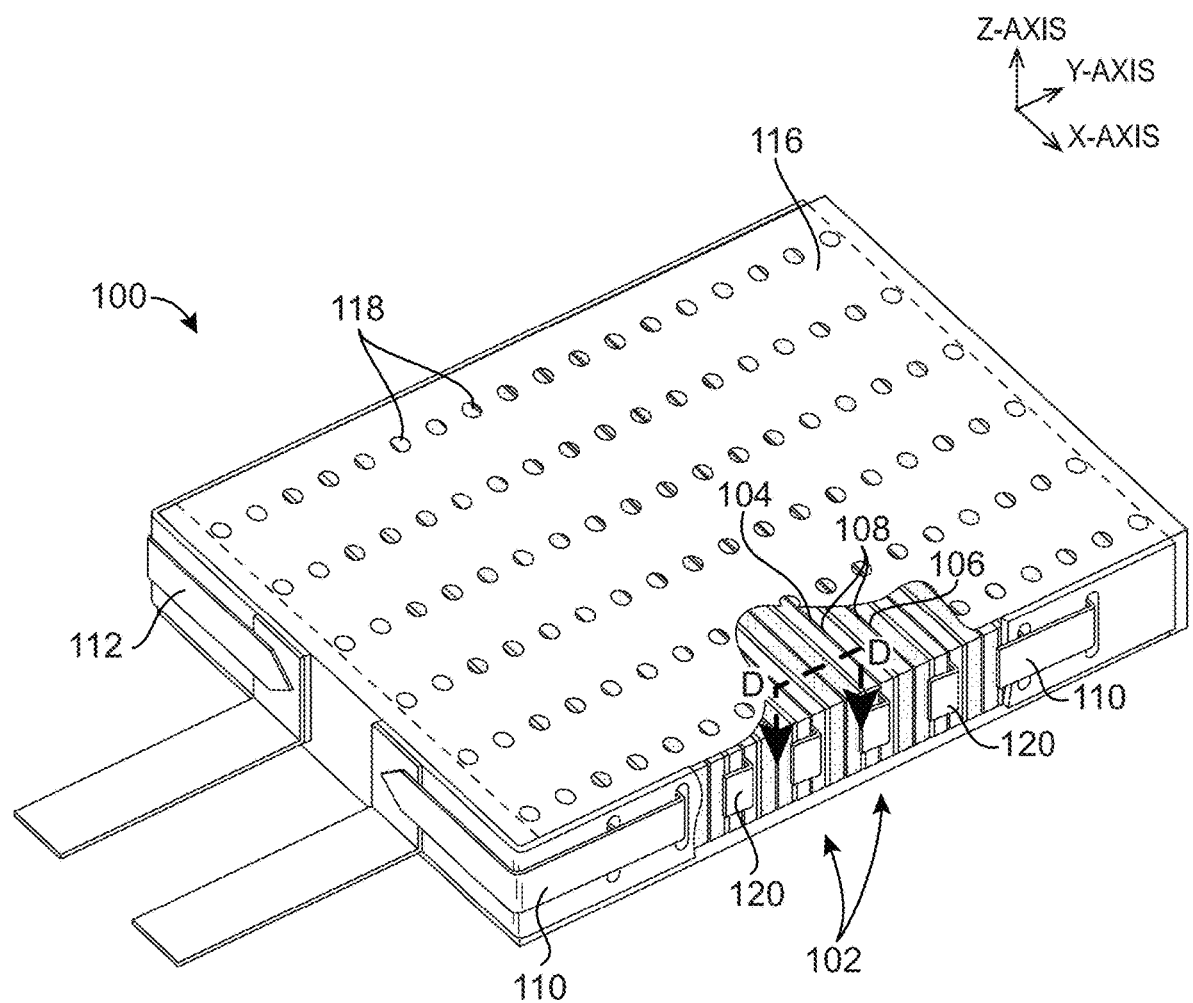
FIG. 1 is front perspective view of one suitable embodiment of a battery assembly having a cutaway portion, prior to application of a protection layer according to the present disclosure.

"A," "an," and "the" (i.e., singular forms) as used herein refer to plural referents unless the context clearly dictates otherwise. For example, in one instance, reference to "an electrode" includes both a single electrode and a plurality of similar electrodes.

"About" and "approximately" as used herein refers to plus or minus 10%, 5%, or 1% of the value stated. For example, in one instance, about 250 µm would include 225 µm to 275 µm. By way of further example, in one instance, about 1,000 µm would include 900 µm to 1,100 µm. Unless otherwise indicated, all numbers expressing quantities (e.g., measurements, and the like) and so forth used in the specification and claims are to be understood as being modified in all instances by the term "about." Accordingly, unless indicated to the contrary, the numerical parameters set forth in the following specification and attached claims are approximations. Each numerical parameter should at least be construed in light of the number of reported significant digits and by applying ordinary rounding techniques.

"Anode" as used herein in the context of a secondary battery refers to the negative electrode in a secondary battery.

"Anode material" or "Anodically active" as used herein means material suitable for use as the negative electrode of a secondary battery "Cathode" as used herein in the context of a secondary battery refers to the positive electrode in a secondary battery "Cathode material" or "Cathodically active" as used herein means material suitable for use as the positive electrode of a secondary battery.

"Conversion chemistry active material" or "Conversion chemistry material" refers to a material that undergoes a chemical reaction during the charging and discharging cycles of a secondary battery.

"Counter electrode" as used herein may refer to the negative or positive electrode (anode or cathode), opposite of the Electrode, of a secondary battery unless the context clearly indicates otherwise.

"Cycle" as used herein in the context of cycling of a secondary battery between charged and discharged states refers to charging and/or discharging a battery to move the battery in a cycle from a first state that is either a charged or discharged state, to a second state that is the opposite of the first state (i.e., a charged state if the first state was discharged, or a discharged state if the first state was charged), and then moving the battery back to the first state to complete the cycle. For example, a single cycle of the secondary battery between charged and discharged states can include, as in a charge cycle, charging the battery from a discharged state to a charged state, and then discharging back to the discharged state, to complete the cycle. The single cycle can also include, as in a discharge cycle, discharging the battery from the charged state to the discharged state, and then charging back to a charged state, to complete the cycle.

"Electrochemically active material" as used herein means anodically active or cathodically active material.

"Electrode" as used herein may refer to the negative or positive electrode (anode or cathode) of a secondary battery unless the context clearly indicates otherwise.

"Electrode current collector layer" as used herein may refer to an anode (e.g., negative) current collector layer or a cathode (e.g., positive) current collector layer.

"Electrode material" as used herein may refer to anode material or cathode material unless the context clearly indicates otherwise.

"Electrode structure" as used herein may refer to an anode structure (e.g., negative electrode structure) or a cathode structure (e.g., positive electrode structure) adapted for use in a battery unless the context clearly indicates otherwise.

"Longitudinal axis," "transverse axis," and "vertical axis," as used herein refer to mutually perpendicular axes (i.e., each are orthogonal to one another). For example, the "longitudinal axis," "transverse axis," and the "vertical axis" as used herein are akin to a Cartesian coordinate system used to define three-dimensional aspects or orientations. As such, the descriptions of elements of the disclosed subject matter herein are not limited to the particular axis or axes used to describe three-dimensional orientations of the elements. Alternatively stated, the axes may be interchangeable when referring to three-dimensional aspects of the disclosed subject matter. "Weakened region" refers to a portion of the web that has undergone a processing operation such as scoring, cutting, perforation or the like such that the local rupture strength of the weakened region is lower than the rupture strength of a non-weakened region.

DETAILED DESCRIPTION

Embodiments of the present disclosure relate to protection layers for components for batteries, such as secondary batteries, for reducing the occurrences of damage to the components to maintain the functionality, safety and/or output of the battery.

Figure 2:
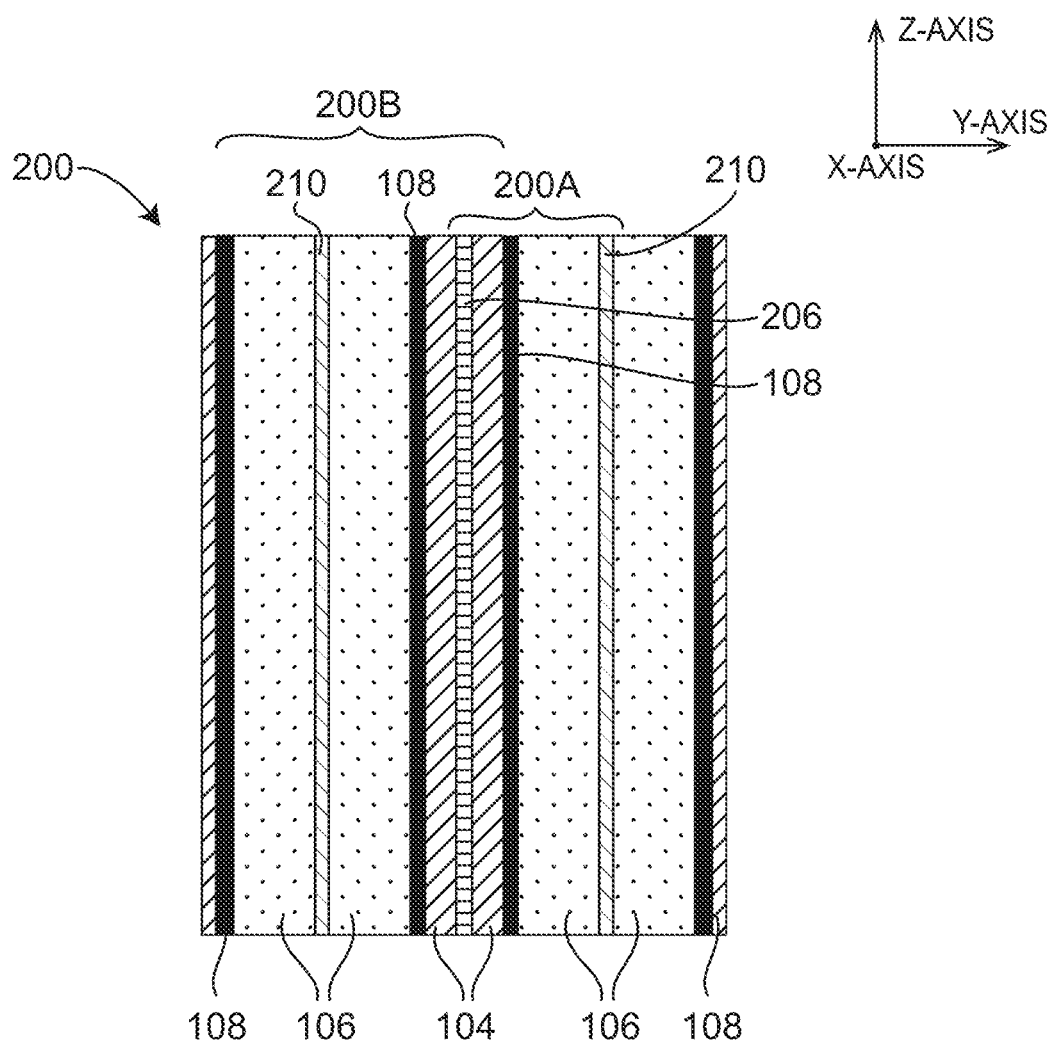
FIG. 2 is section view taken from section line D-D of an electrode assembly of FIG. 1.

One suitable embodiment of a battery assembly 100, prior to application of a protection layer, is described with reference to FIG. 1. As illustrated in FIG. 1, the battery assembly 100 includes a population of adjacent electrode sub-units 102. Each electrode sub-unit 102 has a dimension in the X-axis, Y-axis and Z-axis, respectively. The X, Y and Z-axes are each mutually perpendicular, akin to a Cartesian coordinate system. As used herein, dimensions of each electrode sub-unit 102 in the Z-axis may be referred to as a "height", dimensions in the X-axis may be referred to as a "length" and dimensions in the Y-axis may be referred to as a "width." Electrode sub-units may be combined into one or more unit cells 200 (FIG. 2). Each electrode unit cell 200 comprises at least one anodically active material layer 104 and at least one cathodically active material layer 106. The anodically active material layer 104 and cathodically active material layer 106 are electrically isolated from each other by a separator layer 108. It should be appreciated that in suitable embodiments of the present disclosure, any number of electrode sub-units 102 may be used, such as from 1 to 200 or more sub-units in a single battery assembly 100.

With reference still to FIG. 1, the battery assembly 100 includes bus bars 110 and 112 that are in electrical contact with an anodically active layer 104 and a cathodically active layer 106 of each electrode sub-unit 102, respectively, via an electrode tab (or current collector tab) 120. Accordingly, the bus bar 110 seen in FIG. 1 may be referred to as an anode bus bar and the bus bar 112 may be referred to as a cathode bus bar. In one embodiment, a casing 116, which may be referred to as a constraint, may be applied over one or both of the X-Y surfaces of the battery assembly 100. In the embodiment shown in FIG. 1, the casing 116 includes a population of perforations 118 to facilitate distribution or flow of an electrolyte solution, once the battery assembly 100 has been fully assembled.

In one embodiment, each of the anodically active layer 104 and the cathodically active layer 106 may be a multi-layer material including, for example, an electrode current collector layer (i.e., an anode current collector layer or a cathode current collector layer), and an electrochemically active material layer (i.e., a layer of anodically active material or a layer of cathodically active material) on at least one major surface thereof, and in other embodiments one or more of the anodically active layer and the cathodically active layer may be a single layer of appropriate material.

With reference to FIG. 2, individual layers of the electrode unit cell 200, which may be the same as or similar to electrode sub-units 102, are described. For each of the unit cells 200, in some embodiments, the separator layer 108 is an ionically permeable polymeric woven material suitable for use as a separator in a secondary battery. A cross sectional view of one embodiment of unit cell 200, is shown in FIG. 2. In this embodiment, the electrode sub-unit 200 comprises anode current collector layer 206 in the center, anodically active material layer 104, separator 108, cathodically active material layer 106 and cathode current collector layer 210 in a stacked formation. In an alternative embodiment, the placement of the cathodically active material layer 106 and the anodically active material layer 104 may be swapped, such that the cathodically active material layer(s) 106 are toward the center and the anodically active material layer(s) are distal to the cathodically active material layers 106. In one embodiment, the unit cell 200A includes a cathode current collector 210, a cathodically active material layer 106, a separator 108, an anodically active material layer 104 and an anode current collector 206 in stacked succession, from right to left in the illustration of FIG. 2. In an alternative embodiment, unit cell 200B includes a separator 108, a first layer of cathodically active material layer 106, cathode current collector 210, a second layer of cathodically active material layer 106, a separator 108, a first layer of anodically active material layer 104, anode current collector 206, a second layer of anodically active material layer 104 and a separator 108, in stacked succession, from left to right in the illustration of FIG. 2.

In one embodiment, the anode current collector layer 206 may comprise a conductive metal such as copper, copper alloys, carbon, nickel, stainless steel or any other material suitable as an anode current collector layer. The anodically active material layer 104 may be formed as a first layer on a first surface of the anode current collector layer 206 and a second layer on a second opposing surface of the anode current collector layer 206. In another embodiment, the anode current collector layer 206 and anodically active material layer 104 may be intermixed. The first surface and the second opposing surface may be referred to as major surfaces, or front and back surfaces, of the layer. A major surface, as used herein, refers to the surfaces defined by the plane formed by the length of the material in X-Axis direction (not shown in FIG. 2) and the height of the material in the Z-Axis direction.

In one embodiment, the anodically active material layer(s) 104 may each have a thickness of at least about 10 um. For example, in one embodiment, the anodically active material layer(s) 104 will (each) have a width in the Y-axis direction of at least about 40 um. By way of further example, in one such embodiment, the anodically active material layer(s) 104 will (each) have a width of at least about 80 um. By way of further example, in one such embodiment, the anodically active material layers 104 will each have a width of at least about 120 um. Typically, however, the anodically active material layers 104 will each have a width of less than about 60 um or even less than about 30 um. As used herein, the term thickness and width may be used interchangeably to denote a measurement in the Y-axis direction.

In general, the negative electrode active material (e.g., anodically active material) may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, ZnCo2O4; (f) particles of graphite and carbon; (g) lithium metal, and (h) combinations thereof.

Exemplary anodically active materials include carbon materials such as graphite and soft or hard carbons, or graphene (e.g., single-walled or multi-walled carbon nanotubes), or any of a range of metals, semi-metals, alloys, oxides, nitrides and compounds capable of intercalating lithium or forming an alloy with lithium. Specific examples of the metals or semi-metals capable of constituting the anode material include graphite, tin, lead, magnesium, aluminum, boron, gallium, silicon, Si/C composites, Si/graphite blends, silicon oxide (SiOx), porous Si, intermetallic Si alloys, indium, zirconium, germanium, bismuth, cadmium, antimony, silver, zinc, arsenic, hafnium, yttrium, lithium, sodium, graphite, carbon, lithium titanate, palladium, and mixtures thereof. In one exemplary embodiment, the anodically active material comprises aluminum, tin, or silicon, or an oxide thereof, a nitride thereof, a fluoride thereof, or other alloy thereof. In another exemplary embodiment, the anodically active material comprises silicon or an alloy or oxide thereof.

In one embodiment, the anodically active material is microstructured to provide a significant void volume fraction to accommodate volume expansion and contraction as lithium ions (or other carrier ions) are incorporated into or leave the negative electrode active material during charging and discharging processes. In general, the void volume fraction of each of the anodically active material layer(s) 104 is at least 0.1. Typically, however, the void volume fraction of each of the anodically active material layer(s) is not greater than 0.8. For example, in one embodiment, the void volume fraction of each of the anodically active material layer(s) 104 is about 0.15 to about 0.75. By way of the further example, in one embodiment, the void volume fraction of (each of) the anodically active material layer(s) 104 is about 0.2 to about 0.7. By way of the further example, in one embodiment, the void volume fraction of each of the anodically active material layer(s) 104 is about 0.25 to about 0.6.

Depending upon the composition of the microstructured anodically active material and the method of its formation, the microstructured anodically active material may comprise macroporous, microporous, or mesoporous material layers or a combination thereof, such as a combination of microporous and mesoporous, or a combination of mesoporous and macroporous. Microporous material is typically characterized by a pore dimension of less than 10 nm, a wall dimension of less than 10 nm, a pore depth of 1-50 micrometers, and a pore morphology that is generally characterized by a "spongy" and irregular appearance, walls that are not smooth, and branched pores. Mesoporous material is typically characterized by a pore dimension of 10-50 nm, a wall dimension of 10-50 nm, a pore depth of 1-100 micrometers, and a pore morphology that is generally characterized by branched pores that are somewhat well defined or dendritic pores. Macroporous material is typically characterized by a pore dimension of greater than 50 nm, a wall dimension of greater than 50 nm, a pore depth of 1-500 micrometers, and a pore morphology that may be varied, straight, branched, or dendritic, and smooth or rough-walled. Additionally, the void volume may comprise open or closed voids, or a combination thereof. In one embodiment, the void volume comprises open voids, that is, the negative electrode active material contains voids having openings at the lateral surface of the negative electrode active material through which lithium ions (or other carrier ions) can enter or leave the anodically active material; for example, lithium ions may enter the anodically active material through the void openings after leaving the cathodically active material. In another embodiment, the void volume comprises closed voids, that is, the anodically active material contains voids that are enclosed by anodically active material. In general, open voids can provide greater interfacial surface area for the carrier ions whereas closed voids tend to be less susceptible to solid electrolyte interface while each provides room for expansion of the anodically active material upon the entry of carrier ions. In certain embodiments, therefore, it is preferred that the anodically active material comprise a combination of open and closed voids.

In one embodiment, the anodically active material comprises porous aluminum, tin or silicon or an alloy, an oxide, or a nitride thereof. Porous silicon layers may be formed, for example, by anodization, by etching (e.g., by depositing precious metals such as gold, platinum, silver or gold/palladium on the surface of single crystal silicon and etching the surface with a mixture of hydrofluoric acid and hydrogen peroxide), or by other methods known in the art such as patterned chemical etching. Additionally, the porous anodically active material will generally have a porosity fraction of at least about 0.1, but less than 0.8 and have a thickness of about 1 to about 100 micrometers. For example, in one embodiment, the anodically active material comprises porous silicon, has a thickness of about 5 to about 100 micrometers, and has a porosity fraction of about 0.15 to about 0.75. By way of further example, in one embodiment, the anodically active material comprises porous silicon, has a thickness of about 10 to about 80 micrometers, and has a porosity fraction of about 0.15 to about 0.7. By way of further example, in one such embodiment, the anodically active material comprises porous silicon, has a thickness of about 20 to about 50 micrometers, and has a porosity fraction of about 0.25 to about 0.6. By way of further example, in one embodiment, the anodically active material comprises a porous silicon alloy (such as nickel silicide), has a thickness of about 5 to about 100 micrometers, and has a porosity fraction of about 0.15 to about 0.75.

In another embodiment, the anodically active material comprises fibers of aluminum, tin or silicon, or an alloy thereof. Individual fibers may have a diameter (thickness dimension) of about 5 nm to about 10,000 nm and a length generally corresponding to the thickness of the anodically active material. Fibers (nanowires) of silicon may be formed, for example, by chemical vapor deposition or other techniques known in the art such as vapor liquid solid (VLS) growth and solid liquid solid (SLS) growth. Additionally, the anodically active material will generally have a porosity fraction of at least about 0.1, but less than 0.8 and have a thickness of about 1 to about 200 micrometers. For example, in one embodiment, the anodically active material comprises silicon nanowires, has a thickness of about 5 to about 100 micrometers, and has a porosity fraction of about 0.15 to about 0.75. By way of further example, in one embodiment, the anodically active material comprises silicon nanowires, has a thickness of about 10 to about 80 micrometers, and has a porosity fraction of about 0.15 to about 0.7. By way of further example, in one such embodiment, the anodically active material comprises silicon nanowires, has a thickness of about 20 to about 50 micrometers, and has a porosity fraction of about 0.25 to about 0.6. By way of further example, in one embodiment, the anodically active material comprises nanowires of a silicon alloy (such as nickel silicide), has a thickness of about 5 to about 100 micrometers, and has a porosity fraction of about 0.15 to about 0.75.

In yet other embodiments, the negative electrode (i.e., the electrode or the counter-electrode depending on context) or anodically active material layer 104 is coated with a particulate lithium material selected from the group consisting of stabilized lithium metal particles, e.g., lithium carbonate-stabilized lithium metal powder, lithium silicate stabilized lithium metal powder, or other source of stabilized lithium metal powder or ink. The particulate lithium material may be applied on the anodically active material layer 104 (e.g., negative electrode) by spraying, loading or otherwise disposing the lithium particulate material onto the negative electrode active material layer at a loading amount of about 0.05 to 5 mg/cm², e.g., about 0.1 to 4 mg/cm², or even about 0.5 to 3 mg/cm². The average particle size ($D_{50}$) of the lithium particulate material may be 5 to 200 μm, e.g., about 10 to 100 μm, 20 to 80 μm, or even about 30 to 50 μm. The average particle size ($D_{50}$) may be defined as a particle size corresponding to 50% in a cumulative volume-based particle size distribution curve. The average particle size ($D_{50}$) may be measured, for example, using a laser diffraction method.

In general, the anode current collector 206 will have an electrical conductivity of at least about $10^3$ Siemens/cm. For example, in one such embodiment, the anode current collector will have a conductivity of at least about $10^4$ Siemens/cm. By way of further example, in one such embodiment, the anode current collector will have a conductivity of at least about $10^5$ Siemens/cm. Exemplary electrically conductive materials suitable for use as anode current collectors 206 include metals, such as, copper, nickel, stainless steel, carbon, cobalt, titanium, and tungsten, and alloys thereof.

Referring again to FIG. 2, in another suitable embodiment, the unit cell 200 includes one or more cathode current collector layer 210 and one or more cathodically active material layer 106. The cathode current collector layer 210 of the cathode material may comprise aluminum, an aluminum alloy, titanium or any other material suitable for use as a cathode current collector layer 210. The cathodically active material layer 106 may be formed as a first layer on a first surface of the cathode current collector layer 210 and a second layer on a second opposing surface of the cathode current collector layer 210. The cathodically active material layer 106 may be coated onto one or both sides of cathode current collector layer 210. Similarly, the cathodically active material layer 106 may be coated onto one or both major surfaces of cathode current collector layer 210. In another embodiment, the cathode current collector layer 210 may be intermixed with cathodically active material layer 106.

In one embodiment, the cathodically active material layer(s) 106 will each have a thickness of at least about 20 um. For example, in one embodiment, the cathodically active material layer(s) 106 will each have a thickness of at least about 40 um. By way of further example, in one such embodiment the cathodically active material layer(s) 106 will each have a thickness of at least about 60 um. By way of further example, in one such embodiment the cathodically active material layers 106 will each have a thickness of at least about 100 um. Typically, however, the cathodically active material layer(s) 106 will each have a thickness of less than about 90 um or even less than about 70 um.

In one embodiment, the positive electrode (e.g., cathode) material may comprise, or may be, an intercalation-type chemistry active material, a conversion chemistry active material, or a combination thereof.

Exemplary conversion chemistry materials useful in the present disclosure include, but are not limited to, S (or $Li_2S$ in the lithiated state), LiF, Fe, Cu, Ni, $FeF_2$, $FeO_dF_{3-2d}$, $FeF_3$, $CoF_3$, $CoF_2$, $CuF_2$, $NiF_2$, where $0 \leq d \leq 0.5$, and the like.

Exemplary cathodically active materials also include any of a wide range of intercalation type cathodically active materials. For example, for a lithium-ion battery, the cathodically active material may comprise a cathodically active material selected from transition metal oxides, transition metal sulfides, transition metal nitrides, lithium-transition metal oxides, lithium-transition metal sulfides, and lithium-transition metal nitrides may be selectively used. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pd, Pt, Cu, Ag, and Au. Additional cathode active materials include $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum oxysulfides, phosphates, silicates, vanadates, sulfur, sulfur compounds, oxygen (air), $Li(Ni_xMn_yCo_z)O_2$, and combinations thereof.

In general, the cathode current collector 210 will have an electrical conductivity of at least about $10^3$ Siemens/cm. For example, in one such embodiment, the cathode current collector 210 will have a conductivity of at least about $10^4$ Siemens/cm. By way of further example, in one such embodiment, the cathode current collector 210 will have a conductivity of at least about $10^5$ Siemens/cm. Exemplary electrically conductive materials suitable for use as cathode current collectors 210 include metals, such as aluminum, nickel, cobalt, titanium, and tungsten, and alloys thereof.

Referring again to FIG. 2, in one embodiment, the electrically insulating separator layer(s) 108 is/are adapted to electrically isolate each member of the anodically active material layer 104 from each member of the cathodically active material layer 106. Electrically insulating separator layer 108 will typically include a microporous separator material that can be permeated with a non-aqueous electrolyte; for example, in one embodiment, the microporous separator material includes pores having a diameter of at least 50 Å, more typically in the range of about 2,500 Å, and a porosity in the range of about 25% to about 75%, more typically in the range of about 35-55%.

In one embodiment, the electrically insulating separator material layers 108 will each have a thickness of at least about 4 um. For example, in one embodiment, the electrically insulating separator material layer 108 will each have a thickness of at least about 8 um. By way of further example, in one such embodiment the electrically insulating separator material layer 108 will each have a thickness of at least about 12 um. By way of further example, in one such embodiment the electrically insulating separator material layer 108 will each have a thickness of at least about 15 um. In another embodiment the electrically insulating separator material layer 108 will each have a thickness of at least about 25 um. In another embodiment the electrically insulating separator material layer 108 will each have a thickness of at least about 50 um. Typically, however, the electrically insulating separator material layer 108 will each have a thickness of less than about 12 um or even less than about 10 um.

In general, the separator material for the separator layer(s) 108 may be selected from a wide range of separator materials having the capacity to conduct carrier ions between the positive and negative active material of a unit cell. For example, the separator material may comprise a microporous separator material that may be permeated with a liquid, nonaqueous electrolyte. Alternatively, the separator material may comprise a gel or solid electrolyte capable of conducting carrier ions between the positive and negative electrodes of a unit cell.

In one embodiment, the separator material may comprise a polymer based electrolyte. Exemplary polymer electrolytes include PEO-based polymer electrolytes, polymer-ceramic composite electrolytes, polymer-ceramic composite electrolytes, and polymer-ceramic composite electrolyte.

In another embodiment, the separator material may comprise an oxide based electrolyte. Exemplary oxide-based electrolytes include lithium lanthanum titanate ($Li_{0.34}La_{0.56}TiO_3$), Al-doped lithium lanthanum zirconate ($Li_{6.24}La_3Zr_2Al_{0.24}O_{11.98}$), Ta-doped lithium lanthanum zirconate ($Li_{6.4}La_3Zr_{1.4}Ta_{0.6}O_{12}$) and lithium aluminum titanium phosphate ($Li_{1.4}Al_{0.4}Ti_{1.6}(PO_4)_3$).

In another embodiment, the separator material may comprise a solid electrolyte. Exemplary solid electrolytes include sulfide based electrolytes such as lithium tin phosphorus sulfide ($Li_{10}SnP_2S_{12}$), lithium phosphorus sulfide ($\beta$-$Li_3PS_4$) and lithium phosphorus sulfur chloride iodide ($Li_6PS_5Cl_{0.9}I_{0.1}$).

In one embodiment, the separator material comprises a microporous separator material comprising a particulate material and a binder, and having a porosity (void fraction) of at least about 20 vol. %. The pores of the microporous separator material will have a diameter of at least 50 Å and will typically fall within the range of about 250 to 2,500 Å. The microporous separator material will typically have a porosity of less than about 75%. In one embodiment, the microporous separator material has a porosity (void fraction) of at least about 25 vol %. In one embodiment, the microporous separator material will have a porosity of about 35-55%.

The binder for the microporous separator material may be selected from a wide range of inorganic or polymeric materials. For example, in one embodiment, the binder is an organic material selected from the group consisting of silicates, phosphates, aluminates, aluminosilicates, and hydroxides such as magnesium hydroxide, calcium hydroxide, etc. For example, in one embodiment, the binder is a fluoropolymer derived from monomers containing vinylidene fluoride, hexafluoropropylene, tetrafluoropropene, and the like. In another embodiment, the binder is a polyolefin such as polyethylene, polypropylene, or polybutene, having any of a range of varying molecular weights and densities. In another embodiment, the binder is selected from the group consisting of ethylene-diene-propene terpolymer, polystyrene, polymethyl methacrylate, polyethylene glycol, polyvinyl acetate, polyvinyl butyral, polyacetal, and polyethyleneglycol diacrylate. In another embodiment, the binder is selected from the group consisting of methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, and polyethylene oxide. In another embodiment, the binder is selected from the group consisting of acrylates, styrenes, epoxies, and silicones. In another embodiment, the binder is a copolymer or blend of two or more of the aforementioned polymers.

The particulate material comprised by the microporous separator material may also be selected from a wide range of materials. In general, such materials have a relatively low electronic and ionic conductivity at operating temperatures and do not corrode under the operating voltages of the battery electrode or current collector contacting the microporous separator material. For example, in one embodiment, the particulate material has a conductivity for carrier ions (e.g., lithium) of less than $1\times10^{-4}$ S/cm. By way of further example, in one embodiment, the particulate material has a conductivity for carrier ions of less than $1\times10^{-5}$ S/cm. By way of further example, in one embodiment, the particulate material has a conductivity for carrier ions of less than $1\times10^{-6}$ S/cm. Exemplary particulate materials include particulate polyethylene, polypropylene, a $TiO_2$-polymer composite, silica aerogel, fumed silica, silica gel, silica hydrogel, silica xerogel, silica sol, colloidal silica, alumina, titania, magnesia, kaolin, talc, diatomaceous earth, calcium silicate, aluminum silicate, calcium carbonate, magnesium carbonate, or a combination thereof. For example, in one embodiment, the particulate material comprises a particulate oxide or nitride such as $TiO_2$, $SiO_2$, $Al_2O_3$, $GeO_2$, $B_2O_3$, $Bi_2O_3$, BaO, ZnO, $ZrO_2$, BN, $Si_3N_4$, $Ge_3N_4$. See, for example, P. Arora and J. Zhang, "Battery Separators" Chemical Reviews 2004, 104, 4419-4462). In one embodiment, the particulate material will have an average particle size of about 20 nm to 2 micrometers, more typically 200 nm to 1.5 micrometers. In one embodiment, the particulate material will have an average particle size of about 500 nm to 1 micrometer.

In an alternative embodiment, the particulate material comprised by the microporous separator material may be bound by techniques such as sintering, binding, curing, etc. while maintaining the void fraction desired for electrolyte ingress to provide the ionic conductivity for the functioning of the battery.

In an assembled energy storage device, such as battery assembly 100, the microporous separator material is permeated with a non-aqueous electrolyte suitable for use as a secondary battery electrolyte. Typically, the non-aqueous electrolyte comprises a lithium salt and/or mixture of salts dissolved in an organic solvent and/or solvent mixture. Exemplary lithium salts include inorganic lithium salts such as $LiClO_4$, $LiBF_4$, $LiPF_6$, $LiAsF_6$, LiCl, and LiBr; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$. Exemplary organic solvents to dissolve the lithium salt include cyclic esters, chain esters, cyclic ethers, and chain ethers. Specific examples of the cyclic esters include propylene carbonate, butylene carbonate, γ-butyrolactone, vinylene carbonate, 2-methyl-γ-butyrolactone, acetyl-γ-butyrolactone, and γ-valerolactone. Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates. Specific examples of the cyclic ethers include tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane. Specific examples of the chain ethers include 1,2-dimethoxyethane, 1,2-diethoxythane, diethyl ether, ethylene glycol dialkyl ethers, diethylene glycol dialkyl ethers, triethylene glycol dialkyl ethers, and tetraethylene glycol dialkyl ethers.

In one embodiment, the microporous separator layer(s) 108 may be permeated with a non-aqueous, organic electrolyte including a mixture of a lithium salt and a high-purity organic solvent. In addition, the electrolyte may be a polymer using a polymer electrolyte or a solid electrolyte.

With further reference to FIGS. 1 and 2, in one embodiment, the bus bars 110 and 112 are placed through the bus bar openings (not shown) of the respective electrode or counter-electrode (e.g., anode or cathode, as the case may be) to connect the anode current collectors 206 to one another in parallel (in a battery comprising multiple electrode sub-units), and the other of the bus bars connects the cathode current collectors 210 to one another in parallel in a battery comprising multiple unit cells 200. In one embodiment, the bus bars 110, 112 are welded or otherwise electrically coupled to current collector tabs 120 that are folded down respectively, prior to welding. In one embodiment, the bus bar 110 is a copper bus bar and is welded to anode tabs of the anode current collector layer 206, and the bus bar 112 is an aluminum bus bar and is welded to cathode tabs of the cathode current collector layer 210. However, in other embodiments, the bus bars 110, 112 may be any suitable conductive material to allow battery assembly 100 to function as described herein. The welds may be made using a laser welder, friction welding, ultrasonic welding or any suitable welding method for welding the bus bars 110 and 112 to the electrode tabs 120. In one embodiment, each of the bus bars 110 and 112 are in electrical contact with all of the electrode tabs 120 for the anode and cathode, respectively.

As referred to herein, a member of the anode population comprises at least an anode current collector 206 and an anodically active material layer 104. In some embodiments, a member of an anode population comprises an anode current collector 206 and an anodically active material layer 104 disposed on each major surface of the anode current collector 206 The length of the members of the anode population members will vary depending upon the energy storage device and its intended use. In general, however, the members of the anode populations will typically have a length in the range of about 5 mm to about 500 mm. For example, in one such embodiment, the members of the anode population have a length of about 10 mm to about 250 mm. By way of further example, in one such embodiment the members of the anode population have a length of about 25 mm to about 100 mm.

The width (Y-axis extent) of the members of the anode population will also vary depending upon the energy storage device and its intended use. In general, however, each member of the anode population will typically have a width within the range of about 0.01 mm to 2.5 mm. For example, in one embodiment, the width of each member of the anode population will be in the range of about 0.025 mm to about 2 mm. By way of further example, in one embodiment, the width of each member of the anode population will be in the range of about 0.05 mm to about 1 mm.

The height (Z-axis extent) of the members of the anode population will also vary depending upon the energy storage device and its intended use. In general, however, members of the anode population will typically have a height within the range of about 0.05 mm to about 25 mm. For example, in one embodiment, the height of each member of the anode population will be in the range of about 0.05 mm to about 5 mm. By way of further example, in one embodiment, the height of each member of the anode population will be in the range of about 0.1 mm to about 1 mm. According to one embodiment, the members of the anode population include one or more first electrode members having a first height, and one or more second electrode members having a second height that is other than the first. In yet another embodiment, the different heights for the one or more first electrode members and one or more second electrode members may be selected to accommodate a predetermined shape for an electrode assembly, such as an electrode assembly shape having a different heights along one or more of the longitudinal and/or transverse axis, and/or to provide predetermined performance characteristics for the secondary battery. According to another embodiment, the members of the anode population include one or more first electrode members having a first width, and one or more second electrode members having a second width that is other than the first. In yet another embodiment, the different widths for the one or more first electrode members and one or more second electrode members may be selected to accommodate a predetermined shape for an electrode assembly, such as an electrode assembly shape having a different widths and/or to provide predetermined performance characteristics for the secondary battery. According to yet another embodiment, the members of the anode population include one or more first electrode members having a first length, and one or more second electrode members having a second length that is other than the first. In yet another embodiment, the different lengths for the one or more first electrode members and one or more second electrode members may be selected to accommodate a predetermined shape for an electrode assembly, such as an electrode assembly shape having a different lengths and/or to provide predetermined performance characteristics for the secondary battery.

In general, members of the anode population have a length (X-axis extent) that is substantially greater than each of its width and its height. For example, in one embodiment, the ratio of length to each of width and height is at least 5:1, respectively (that is, the ratio of length to width is at least 5:1, respectively and the ratio of length to height is at least 5:1, respectively), for each member of the anode population. By way of further example, in one embodiment the ratio of length to each of width and height is at least 10:1. By way of further example, in one embodiment, the ratio of length to each of width and height is at least 15:1. By way of further example, in one embodiment, the ratio of length to each of width and height is at least 20:1, for each member of the anode population.

In one embodiment, the ratio of the height to the width of the members of the anode population is at least 0.4:1, respectively. For example, in one embodiment, the ratio of height to width will be at least 2:1, respectively, for each member of the anode population. By way of further example, in one embodiment the ratio of height to width will be at least 10:1, respectively. By way of further example, in one embodiment the ratio of height to width will be at least 20:1, respectively. Typically, however, the ratio of height to width will generally be less than 1,000:1, respectively. For example, in one embodiment the ratio of height to width will be less than 500:1, respectively. By way of further example, in one embodiment the ratio of height to width will be less than 100:1, respectively. By way of further example, in one embodiment the ratio of height to width will be less than 10:1, respectively. By way of further example, in one embodiment the ratio of height to width will be in the range of about 2:1 to about 100:1, respectively, for each member of the anode population.

As referred to herein, a member of the cathode population comprises at least a cathode current collector 210 and a cathodically active material layer 106. The length of the members of the cathode population will vary depending upon the energy storage device and its intended use. In general, however, each member of the cathode population will typically have a length in the range of about 5 mm to about 500 mm. For example, in one such embodiment, each member of the cathode population has a length of about 10 mm to about 250 mm. By way of further example, in one such embodiment each member of the cathode population has a length of about 25 mm to about 100 mm.

The width (Y-axis extent) of the members of the cathode population will also vary depending upon the energy storage device and its intended use. In general, however, members of the cathode population will typically have a width within the range of about 0.01 mm to 2.5 mm. For example, in one embodiment, the width of each member of the cathode population will be in the range of about 0.025 mm to about 2 mm. By way of further example, in one embodiment, the width of each member of the cathode population will be in the range of about 0.05 mm to about 1 mm.

The height (Z-axis extent) of the members of the cathode population will also vary depending upon the energy storage device and its intended use. In general, however, members of the cathode population will typically have a height within the range of about 0.05 mm to about 25 mm. For example, in one embodiment, the height of each member of the cathode population will be in the range of about 0.05 mm to about 5 mm. By way of further example, in one embodiment, the height of each member of the cathode population will be in the range of about 0.1 mm to about 1 mm. According to one embodiment, the members of the cathode population include one or more first cathode members having a first height, and one or more second cathode members having a second height that is other than the first. In yet another embodiment, the different heights for the one or more first cathode members and one or more second cathode members may be selected to accommodate a predetermined shape for an electrode assembly, such as an electrode assembly shape having a different heights along one or more of the longitudinal and/or transverse axis, and/or to provide predetermined performance characteristics for the secondary battery. According to another embodiment, the members of the cathode population include one or more first electrode members having a first width, and one or more second electrode members having a second width that is other than the first. In yet another embodiment, the different widths for the one or more first electrode members and one or more second electrode members may be selected to accommodate a predetermined shape for an electrode assembly, such as an electrode assembly shape having a different widths and/or to provide predetermined performance characteristics for the secondary battery. According to yet another embodiment, the members of the cathode population include one or more first electrode members having a first length, and one or more second electrode members having a second length that is other than the first. In yet another embodiment, the different lengths for the one or more first electrode members and one or more second electrode members may be selected to accommodate a predetermined shape for an electrode assembly, such as an electrode assembly shape having a different lengths and/or to provide predetermined performance characteristics for the secondary battery.

In general, each member of the cathode population has a length (X-axis extent) that is substantially greater than its width and substantially greater than its height. For example, in one embodiment, the ratio of length to each of width and height is at least 5:1, respectively (that is, the ratio of length to width is at least 5:1, respectively and the ratio of length to height is at least 5:1, respectively), for each member of the cathode population. By way of further example, in one embodiment the ratio of length to each of width and height is at least 10:1 for each member of the cathode population. By way of further example, in one embodiment, the ratio of length to each of width and height is at least 15:1 for each member of the cathode population. By way of further example, in one embodiment, the ratio of length to each of width and height is at least 20:1 for each member of the cathode population.

In one embodiment, the ratio of the height to the width of the members of the cathode population is at least 0.4:1, respectively. For example, in one embodiment, the ratio of height to width will be at least 2:1, respectively, for each member of the cathode population. By way of further example, in one embodiment the ratio of height to width will be at least 10:1, respectively, for each member of the cathode population. By way of further example, in one embodiment the ratio of height to width will be at least 20:1, respectively, for each member of the cathode population. Typically, however, the ratio of height to width will generally be less than 1,000:1, respectively, for each member of the anode population. For example, in one embodiment the ratio of height to width will be less than 500:1, respectively, for each member of the cathode population. By way of further example, in one embodiment the ratio of height to width will be less than 100:1, respectively. By way of further example, in one embodiment the ratio of height to width will be less than 10:1, respectively. By way of further example, in one embodiment the ratio of height to width will be in the range of about 2:1 to about 100:1, respectively, for each member of the cathode population.

In one embodiment, anode current collector 206 also has an electrical conductance that is substantially greater than the electrical conductance of the negative electrode active material layer 104. It should be noted that negative electrode active material layer 104 may be the same or similar to anodically active material layer 104. For example, in one embodiment the ratio of the electrical conductance of anode current collector 206 to the electrical conductance of the anodically active material layer 104 is at least 100:1 when there is an applied current to store energy in the device or an applied load to discharge the device. By way of further example, in some embodiments the ratio of the electrical conductance of anode current collector 206 to the electrical conductance of the anodically active material layer 104 is at least 500:1 when there is an applied current to store energy in the device or an applied load to discharge the device. By way of further example, in some embodiments the ratio of the electrical conductance of anode current collector 206 to the electrical conductance of the negative electrode active material layer 104 is at least 1000:1 when there is an applied current to store energy in the device or an applied load to discharge the device. By way of further example, in some embodiments the ratio of the electrical conductance of anode current collector 206 to the electrical conductance of the anodically active material layer 104 is at least 5000:1 when there is an applied current to store energy in the device or an applied load to discharge the device. By way of further example, in some embodiments the ratio of the electrical conductance of anode current collector 206 to the electrical conductance of the anodically active material layer 104 is at least 10,000:1 when there is an applied current to store energy in the device or an applied load to discharge the device.

In general, the cathode current collector layer 210 may comprise a metal such as aluminum, carbon, chromium, gold, nickel, NiP, palladium, platinum, rhodium, ruthenium, an alloy of silicon and nickel, titanium, or a combination thereof (see "Current collectors for positive electrodes of lithium-based batteries" by A. H. Whitehead and M. Schreiber, Journal of the Electrochemical Society, 152(11) A2105-A2113 (2005)). By way of further example, in one embodiment, cathode current collector layer 210 comprises gold or an alloy thereof such as gold silicide. By way of further example, in one embodiment, cathode current collector layer 210 comprises nickel or an alloy thereof such as nickel silicide.

Figure 3:
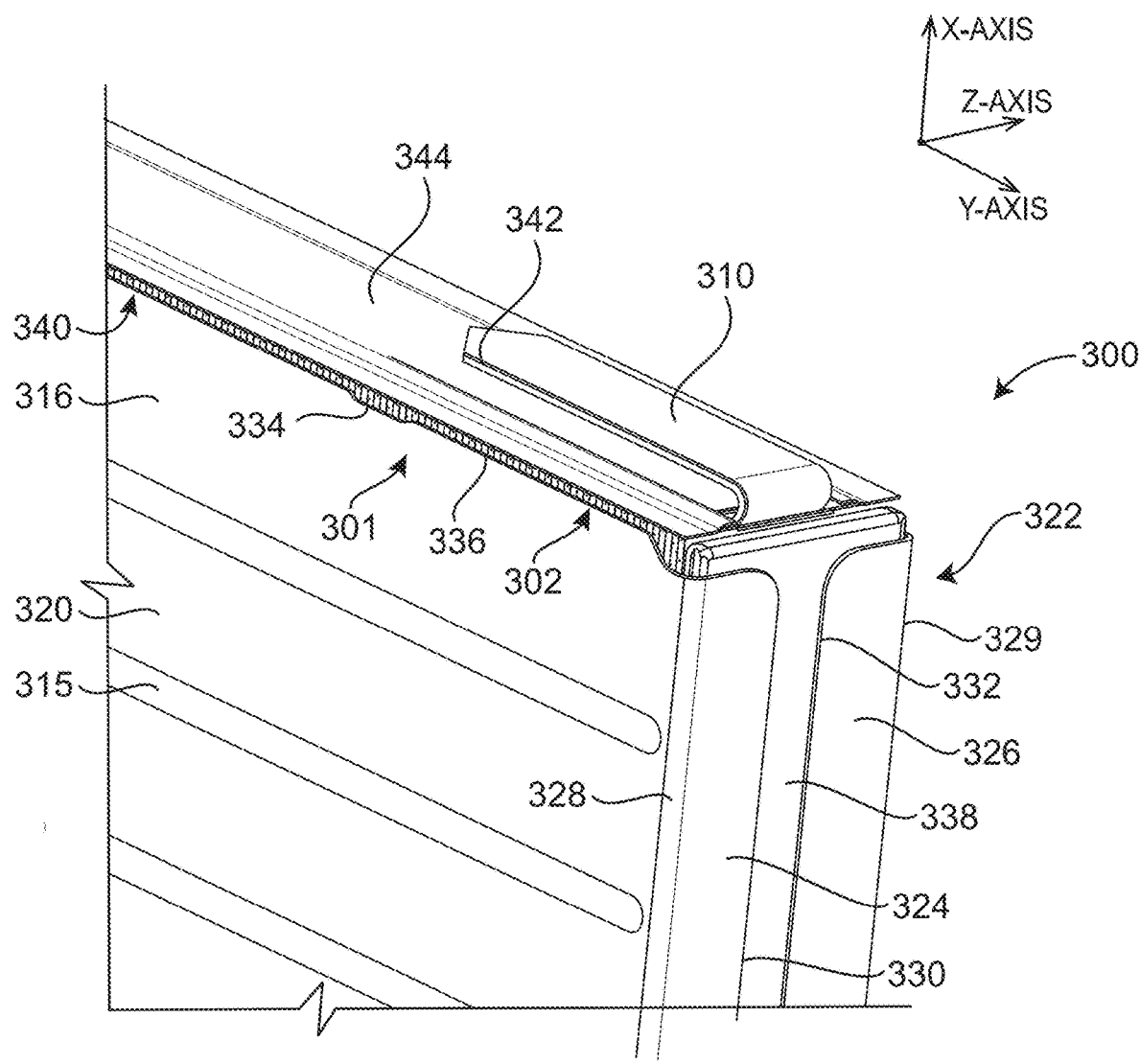
FIG. 3 is an enlarged partial perspective view of a battery assembly within a constraint according to the present disclosure.

Reference is now made to FIG. 3. FIG. 3 is an enlarged partial detail perspective view of a battery assembly 300 (which may be the same as or similar to battery assembly 100) prior to an enclosure protection layer or outer packaging being placed thereon. The battery assembly 300 includes an electrode assembly 301 comprising a population of electrode sub-units 302 (which may be the same or similar to sub-units 102) organized in a stacked arrangement in the Y-Axis direction. Each of the electrode sub-units 302 comprises at least an electrode current conductor layer, an electrode layer comprising an electrode active material (e.g., anodically active material layer), a separator layer, a counter-electrode layer comprising a counter-electrode active material (e.g. cathodically active material layer), and a counter-electrode current collector layer.

In one suitable embodiment, the electrode assembly 301 is enclosed within a volume defined by a constraint 316 (which, in some embodiments, may be the same as or similar to casing 116). In one embodiment, the constraint 316 comprises stainless steel, such as SS 316, 440C or 440C hard. In other embodiments, the constraint comprises aluminum (e.g., aluminum 7075-T6, hard H18, etc.), titanium (e.g., 6Al-4V), beryllium, beryllium copper (hard), copper ($O_2$ free, hard), nickel, other metals or metal alloys, composite, polymer, ceramic (e.g., alumina (e.g., sintered or Coorstek AD96), zirconia (e.g., Coorstek YZTP), yttriastabilizedzirconia (e.g., ENrG E-Strate®)), glass, tempered glass, polyetheretherketone (PEEK) (e.g., Aptiv 1102), PEEK with carbon (e.g., Victrex 90HMF40 or Xycomp 1000-04), polyphenylene sulfide (PPS) with carbon (e.g., Tepex Dynalite 207), polyetheretherketone (PEEK) with 30% glass, (e.g., Victrex 90HMF40 or Xycomp 1000-04), polyimide (e.g., Kapton®), E Glass Std Fabric/Epoxy, 0 deg, E Glass UD/Epoxy, 0 deg, Kevlar Std Fabric/Epoxy, 0 deg, Kevlar UD/Epoxy, 0 deg, Carbon Std Fabric/Epoxy, 0 deg, Carbon UD/Epoxy, 0 deg, Toyobo Zylon® HM Fiber/Epoxy, Kevlar 49 Aramid Fiber, S Glass Fibers, Carbon Fibers, Vectran UM LCP Fibers, Dyneema, Zylon or other suitable material.

Figure 3A:
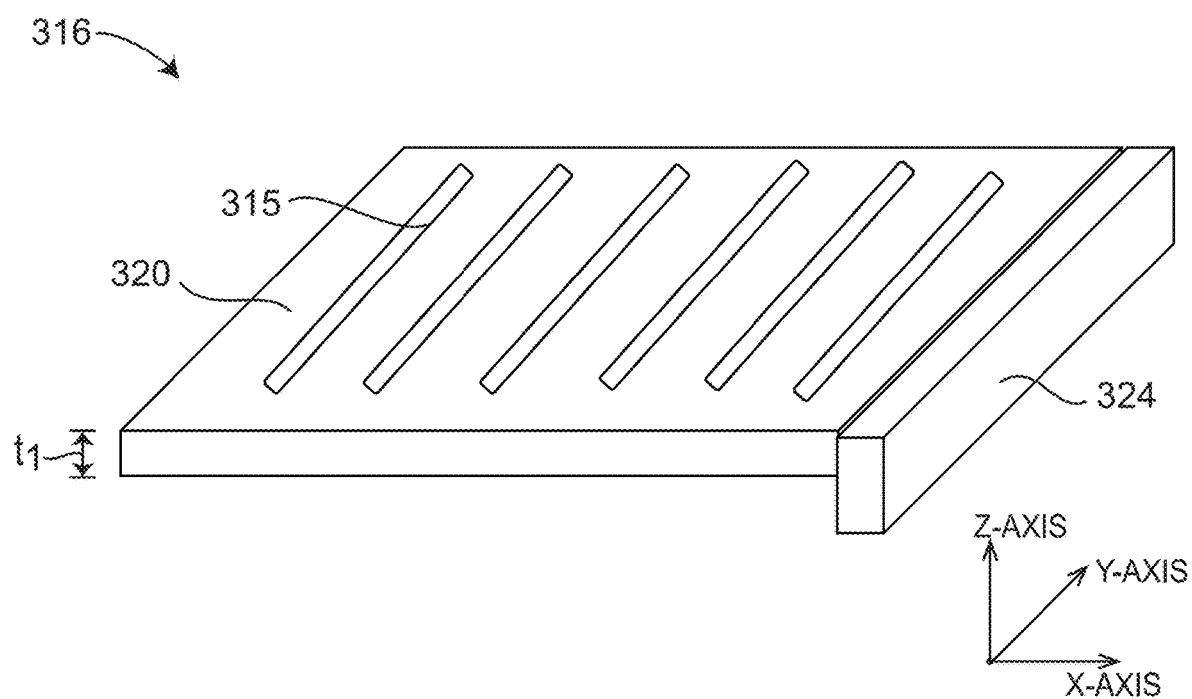
FIG. 3A is a perspective view of an embodiment of a constraint according to the present disclosure.

The constraint 316 comprises a first cover 320 (i.e., a first primary growth constraint) generally aligned along the X-Y plane, and a second cover (i.e., a second primary growth constraint) (not shown in FIG. 3 but substantially the same as the first cover 320 and indicated generally at 322) on an opposing side of the battery assembly 300 that is separated in the Z-axis direction from the first cover 320, also generally aligned along the X-Y plane, having a thickness t1 (FIG. 3A) measured in the Z-axis direction. Thickness ($t_1$) of the constraint 316 may depend upon a range of factors including, for example, the material(s) of construction of the constraint 316, the overall dimensions of the electrode assembly 301, and the composition of the electrode and counter-electrodes. In some embodiments, for example, the constraint 316 will comprise a sheet having a thickness $t_1$ in the range of about 10 to about 100 micrometers. For example, in one such embodiment, the constraint 316 comprises a stainless steel sheet (e.g., SS316) having a thickness of about 30 μm. By way of further example, in another embodiment, the constraint 316 comprises an aluminum sheet (e.g., 7075-T6) having a thickness of about 40 μm. By way of further example, in another embodiment, the constraint 316 comprises a zirconia sheet (e.g., Coorstek YZTP) having a thickness of about 30 μm. By way of further example, in another embodiment, the constraint 316 comprises an E Glass UD/Epoxy 0 deg sheet having a thickness of about 75 μm. By way of further example, in another such embodiment, the constraint 316 comprises 12 μm carbon fibers at >50% packing density. Each of the first cover 320 and second cover 322 may comprise one or more features 315, which may be formed as indentations, through cuts, holes or the like. In one embodiment, the features 315 facilitate pre-lithiation of the battery assembly 300, such as from an external lithium foil electrode (not shown). In such embodiments, the features 315 allow lithium to diffuse therethrough for the facilitation of the pre-lithiation. In one embodiment, there is a third cover 324 (i.e., a first secondary growth constraint) extending in the X-Z plane, and an opposing third cover separated in the Y-axis direction, and a fourth cover 326 (e.g., a second secondary growth constraint) extending in the X-Z plane and an opposing fourth cover separated in the Y-axis direction. In the embodiment shown, the third cover 324 is defined by a folded portion of the first cover 320, that has been folded at a first corner 328, and the fourth cover 326 is defined by a folded portion of the second cover 322 that has been folded at a second corner 329. The first and second corners 328 and 329 may be radiused or angular corners. In one embodiment, first and second corners 328 and 329 are angles at from 90 degrees to 100 degrees. In other embodiments, the third and fourth cover may be a single cover. In one embodiment, the first secondary growth constraint 324 or the first primary growth constraint 320 is connected to surfaces (e.g., upper surfaces) of the electrode or counter-electrode structures of a subset of the unit cell population and the second primary growth constraint 322 or the second secondary growth constraint 326 is connected to other surfaces (e.g., lower surfaces) of the electrode or counter-electrode structures of a subset of the unit cell population.

In one embodiment, a casing edge gap 338 is defined between the third constraint 324 and fourth constraint 326, having a gap distance defined in the Z-axis direction. In one embodiment, the gap distance of casing edge gap 338, in the Z-axis direction, between the third constraint 324 and fourth constraint 326 is less than or equal to 50% of the Z-axis thickness of the battery assembly 300. It should be noted that the opposing side of the battery assembly 300 may include similar constraints to third and fourth constraints 324 and 326. The third constraint comprises a flap edge 330 defined along the X-axis and Z-Axis and the fourth constraint comprises a second flap edge 332 defined along the X-axis and Z-Axis.

Each of the first cover 320 and second cover 322 may comprise one or more notches 334 or lands 336 formed along an edge generally aligned with the Y-axis. In one embodiment, one or more of the size, shape, spacing and quantity of the notches 334 or lands 336 are determined based on manufacturing conditions or limitations. In one embodiment, the notches 334 or lands 336 may facilitate manufacturability, by easing a machining, stamping process, or tear-off of the first cover 320 or second cover 322 from a material stock used in the manufacturing process for the first cover 320 and second cover 322. In addition, the battery assembly 300 includes bus bar(s) 310 that are electrically coupled to one of the electrode sub units 302. Due to the material thickness $t_1$ used for the constraint 316 the constraint comprises an edge surface 340 that protrudes in the Z-axis direction from the electrode structure 301. Similarly, one or more of flap edge 330 and 332 protrude in the Y-axis direction from the battery assembly 300. Additionally, the bus bar(s) 310 protrude from a side surface 344 of the battery in the X-axis direction at a bus bar edge 342. The protruding edges may in some instances create areas of friction or high stress that may puncture battery package 700 (FIG. 7) of the battery. These protruding areas may be referred to as potential puncture points, due to their higher likelihood of causing a puncture through the outer casing than non-protruding portions.

To facilitate a reduction or elimination in the possibility of the puncture points causing a rupture or puncture of the enclosure (e.g., outer casing or pouch), an enclosure protection layer 450 is described with reference to FIG. 4. In one embodiment, the enclosure protection layer (PPL) 450 is disposed around at least a portion of the perimeter of battery assembly 400 (as traveled along the X and Y axes). Battery assembly 400 may be the same or similar to battery assembly 300. The PPL 450 has a height $PL_H$ and a width $PL_W$. Prior to application to the perimeter of the battery assembly 400, the PPL 450 may generally comprise a web or tape, having a length and height $PL_H$ significantly larger than its width $PL_W$. In embodiments, the PPL 450 may comprise a polymer, such as one or more of polyvinylidene fluoride (PVDF), polyethylene (PE), ethylene acrylic acid (EAA), ethylene methacrylic acid (EMAA) or functional derivatives or copolymers or combinations thereof. In one embodiment, the polymer used for PPL 450 is an elastic material. In one embodiment, the PPL height $PL_H$ is substantially equivalent to a height $B_H$ in the Z-axis direction of the battery assembly 400, such that it is capable of covering an entire height of the of the battery assembly 400. With additional reference to FIG. 8, it is noted that the PPL 450 has a thickness $t_2$ in the range of from 25 µm to 500 µm, such as 25 µm, 50 µm, 75 µm, 100 µm, 125 µm, 150 µm, 175 µm, 200 µm, 225 µm, 250 µm, 275 µm, 300 µm, 325 µm, 350 µm, 375 µm, 400 µm, 425 µm, 450 µm, 475 µm or 500 µm prior to application to the battery assembly 400.

Figure 4:
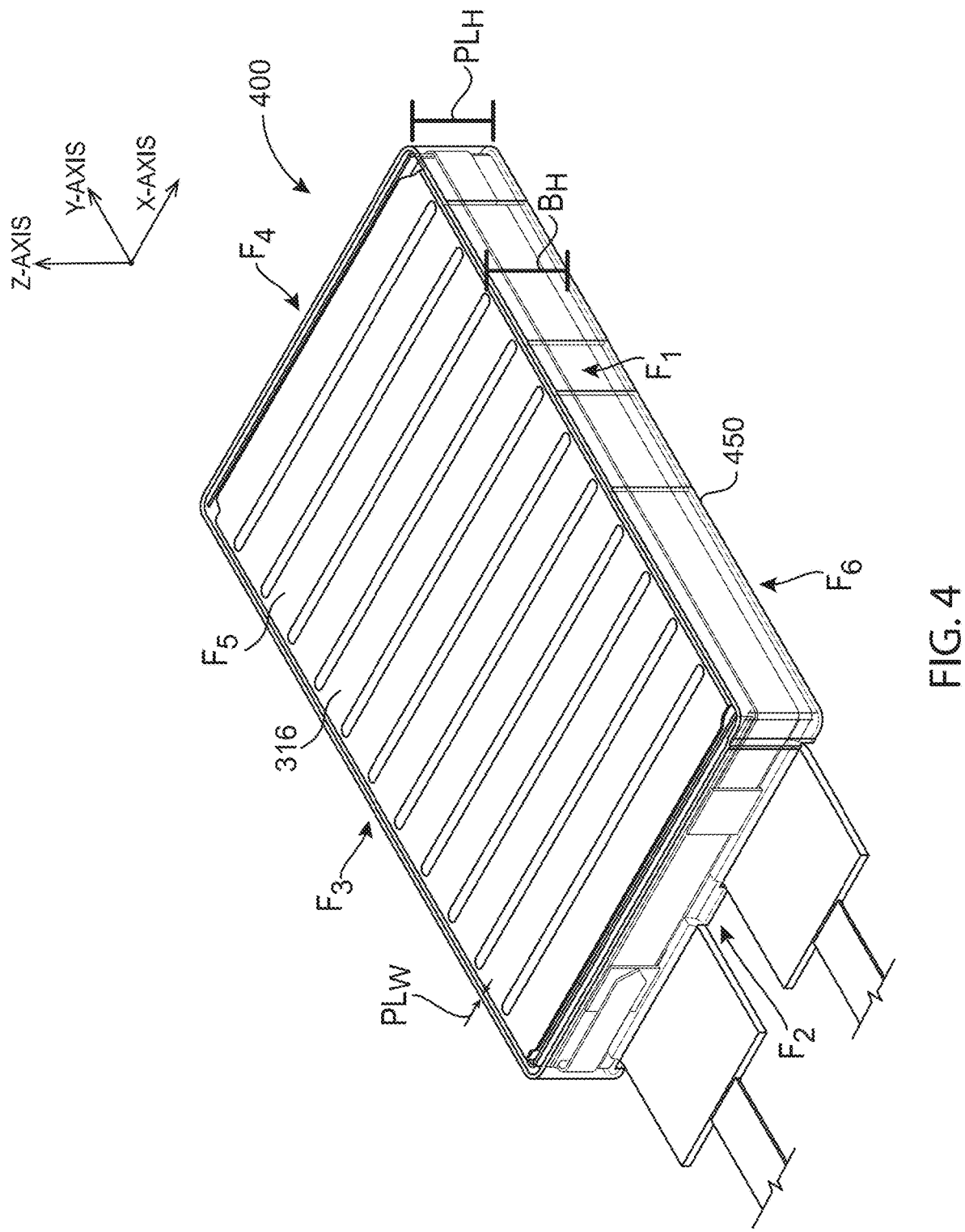
FIG. 4 is a perspective view of a battery assembly including an enclosure protection layer according to an embodiment of the present disclosure.
Figure 4A:
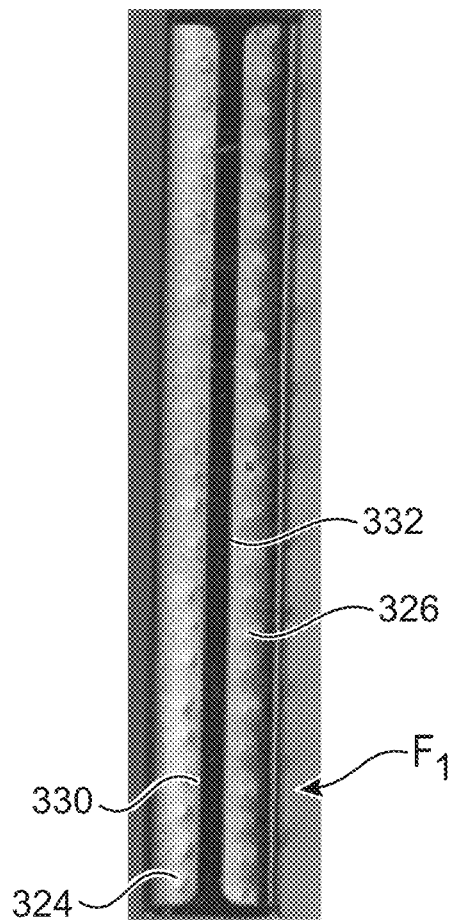
FIGS. 4A and 4C are photos of a face of a battery assembly prior to an enclosure protection layer being applied thereon.
Figure 4B:
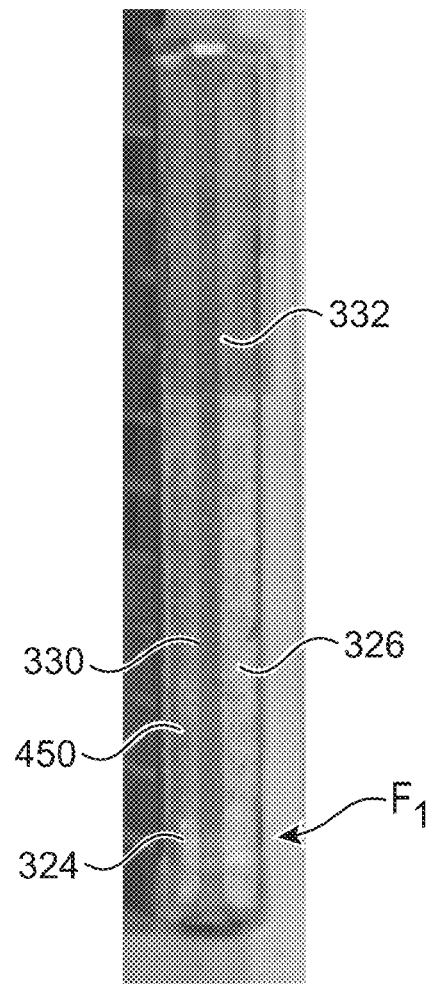
FIGS. 4B and 4D are photos of the faces of the battery assemblies of FIGS. 4A and 4C after application of an enclosure protection layer according to the present disclosure.

With further reference to FIG. 4, the battery assembly 400 has four minor faces $F_{1-4}$ and two major faces $F_{5,6}$. It is noted that in FIG. 4, major face $F_6$ is located on the underside of the battery assembly 400. In one embodiment, the PPL 450 is applied to at least two of the minor surfaces $F_1$ and $F_2$ in a manner such that the PPL 450 covers substantially the entirety of minor surfaces $F_1$ and $F_2$ in the Y-axis and Z-axis directions. As such, the PPL 450 covers the flap edges 330 and 332. With reference to FIGS. 4A and 4B, FIG. 4A is a photograph of a surface $F_1$ prior to application of a PPL 450 and FIG. 4B is a photograph of the same surface $F_1$ after application of the PPL 450. In this embodiment, the PPL 450 is a transparent layer comprising a polymer.

Figure 4C:
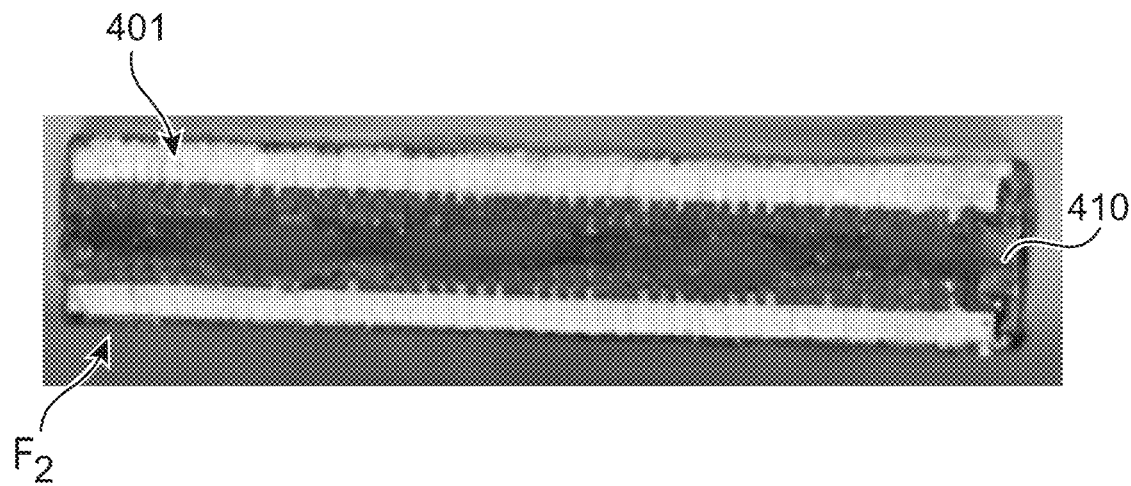
Figure 4D:
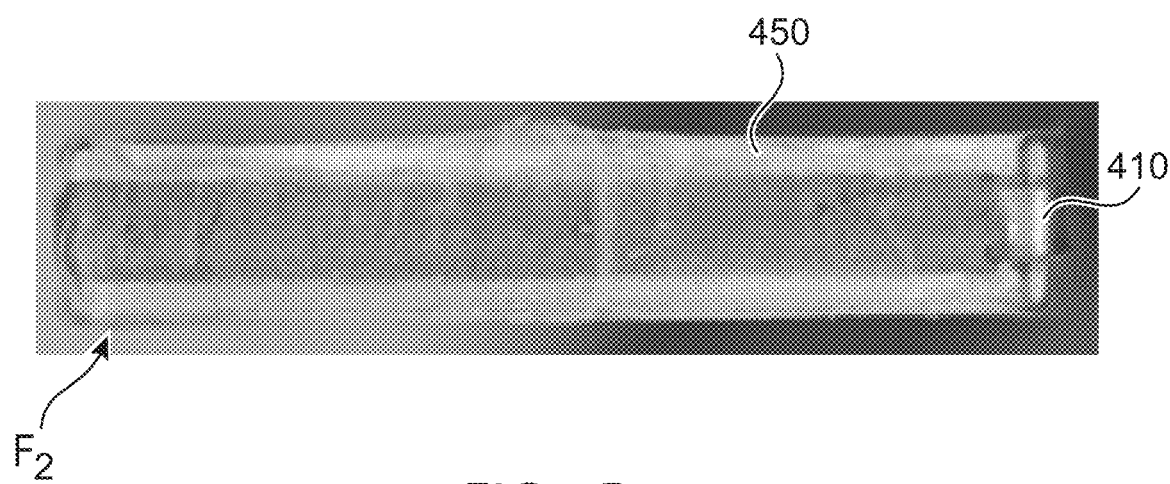

With reference to FIGS. 4C and 4D, FIG. 4C is a photograph of a surface $F_2$ prior to application of a PPL 450 and FIG. 4D is a photograph of the same surface $F_2$ after application of the PPL 450. In this embodiment, the PPL 450 is a transparent layer comprising a polymer. In this embodiment, the battery assembly 400 includes electrode assembly 401, which may be the same as or similar to electrode assembly 301, and bus bar 410, which may be the same as or similar to bus bars 110, 112.

Figure 4E:
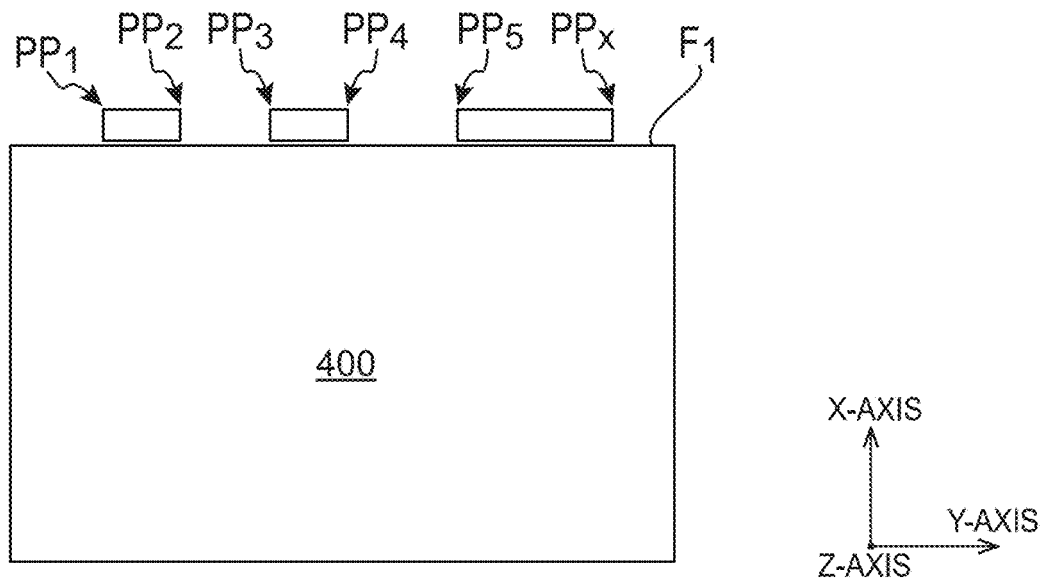
FIG. 4E is a schematic profile view of a battery assembly prior to application of an enclosure protection layer according to the present disclosure.
Figure 4F:
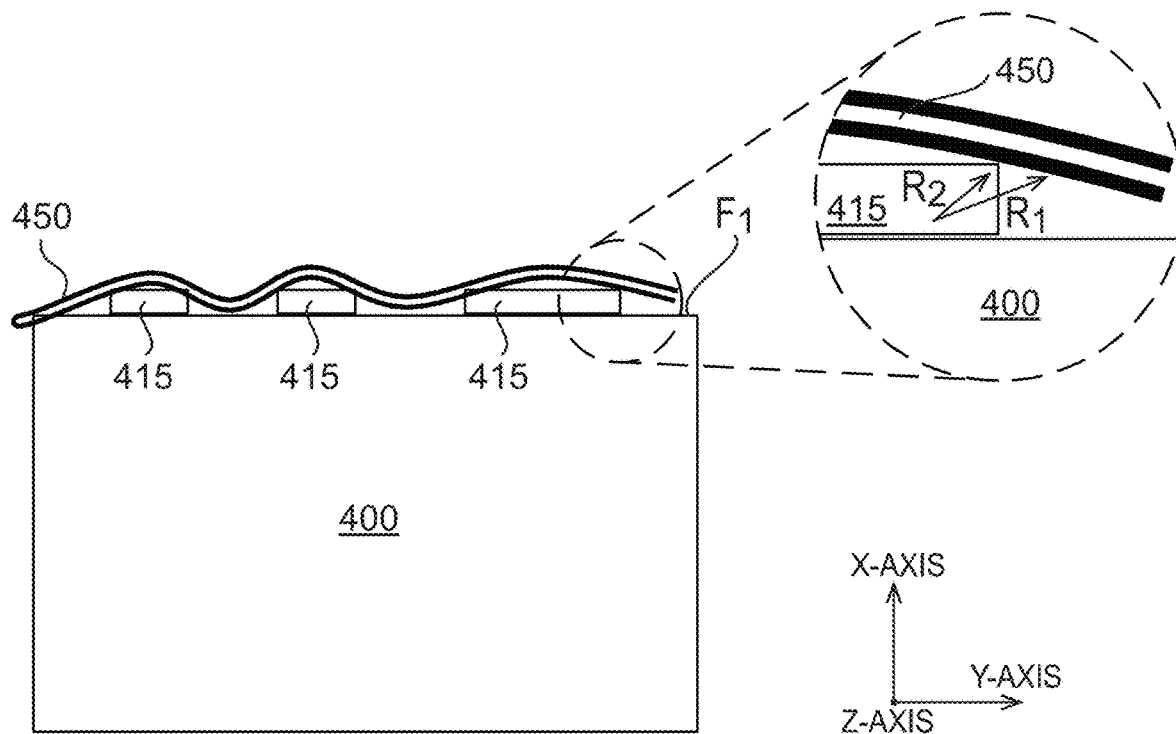
FIG. 4F is a schematic profile view of the battery assembly of FIG. 4E after application of an enclosure protection layer according to the present disclosure.

The PPL 450 may be applied to one or more of the faces $F_{1-6}$ of the battery assembly 400 to cover any of the protrusions 415 that are potential puncture points. With reference to FIGS. 4E and 4F, it is illustrated that the PPL 450 covers, and thus increased the radius of curvature over the protrusions 415 having puncture points $PP_{1-X}$. Each protrusion 415 has a first radius $R_1$ of curvature at a puncture point $PP_{1-x}$. However, the PPL 450, at a point overlying the radius of curvature $R_1$ has a second radius of curvature $R_2$ in the X-Y plane that is greater than the first radius of curvature $R_1$. Accordingly, by covering the puncture points of the protrusions 415 with PPL 450, as illustrated in FIG. 4F, the second radius of curvature $R_2$ over the puncture points in the X-Y plane may be effectively increased as compared to first radius $R_1$, thus reducing the pressure exerted by the puncture point of the protrusion against the enclosure (e.g., enclosure layers 500, 600), and thus facilitating a reduction or elimination of punctures to the enclosure. For example, a series of puncture points $PP_1$-$PP_X$, may be corners of bus bars 110, 112, current collector tabs 120, edges of constraint 316 or the like.

Figure 8:
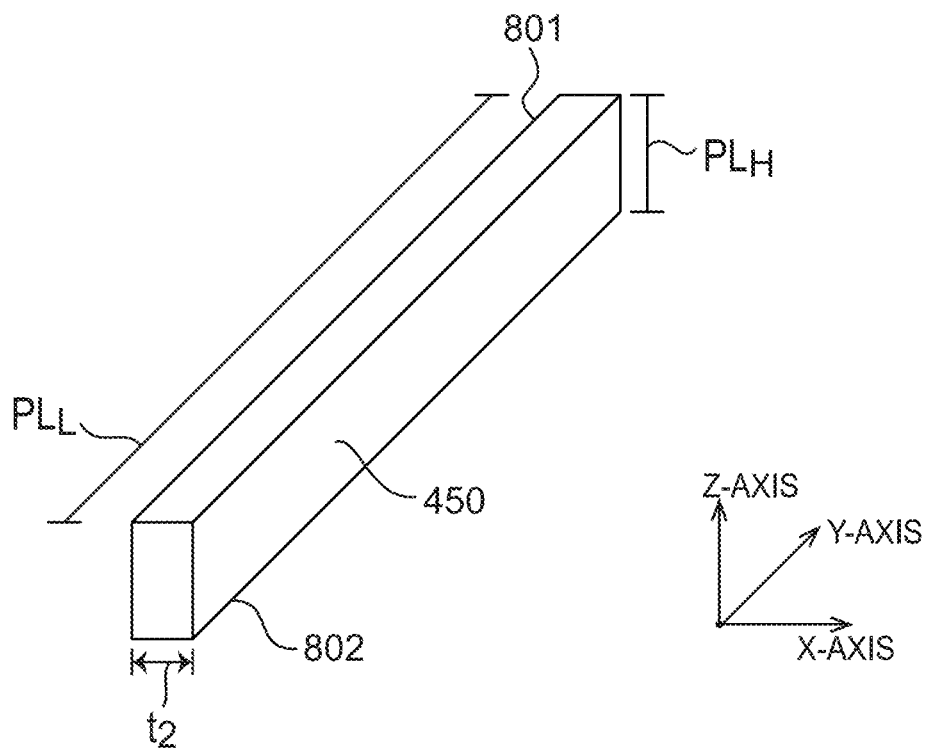
FIG. 8 is a perspective view of a portion of a web of an enclosure protection layer.

In one embodiment, the PPL 450 is initially in the form of an elongated web having a height $PL_H$ a thickness $t_2$ and a length $PL_L$ (FIG. 8). Prior to application of the PPL 450 to one or more faces $F_{1-6}$ of battery assembly 400, the PPL 450 may be cut by any suitable means to a desired length and/or height in order to cover a desired portion of the faces $F_{1-6}$. For example, in one embodiment, PPL 450 is cut to a length $PL_L$ that is substantially the same as the length of face $F_1$ in the Y-axis direction. After cutting, the PPL 450 is placed on face $F_1$ and adhered to face $F_1$ using one or more of heat, pressure and time. In one suitable embodiment, use of heat staking equipment is utilized to heat stake the PPL 450 to desired locations along face $F_1$. In one embodiment, the PPL 450 is heat staked to at least 80% or more of the length of face $F_1$. However, in other embodiments, PPL 450 may be heat staked to any amount, such as from 1% to 100% of the length of face $F_1$. In yet other embodiments, the PPL 450 is heat staked at one or more discrete points along the length of face $F_1$. In some embodiments, depending on the material comprising the PPL 450, the PPL 450 may be heat staked, or otherwise adhered to, face $F_1$ without the use of any additional adhesive. However, in other embodiments, an adhesive layer is used between face $F_1$ and PPL 450 to adhere PPL 450 to face $F_1$. In yet other embodiments, PPL 450 is a multi-layer material having at least one adhesive layer that is adjacent to face $F_1$. In a similar manner, the PPL 450 may be cut and adhered to any or all of faces $F_{1-6}$ using the same or similar process. In yet another embodiment, the PPL 450 is cut to a length equal to the sum of the lengths of faces $F_{1-4}$ (e.g., a circumference of the battery assembly 400), and the PPL 450 is then wrapped around the circumference (e.g., each of faces $F_{1-4}$ and then adhered to such faces).

Figure 9:
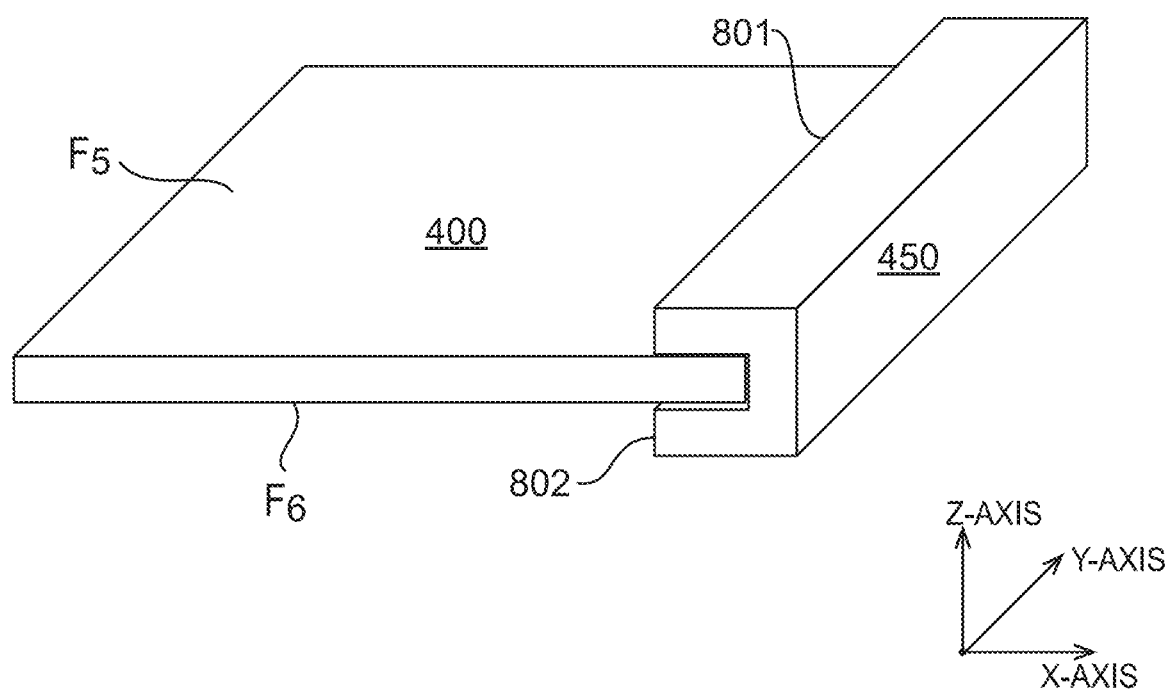
FIG. 9 is a perspective view of an embodiment of an enclosure protection layer on a battery assembly of the present disclosure.
Figure 10:
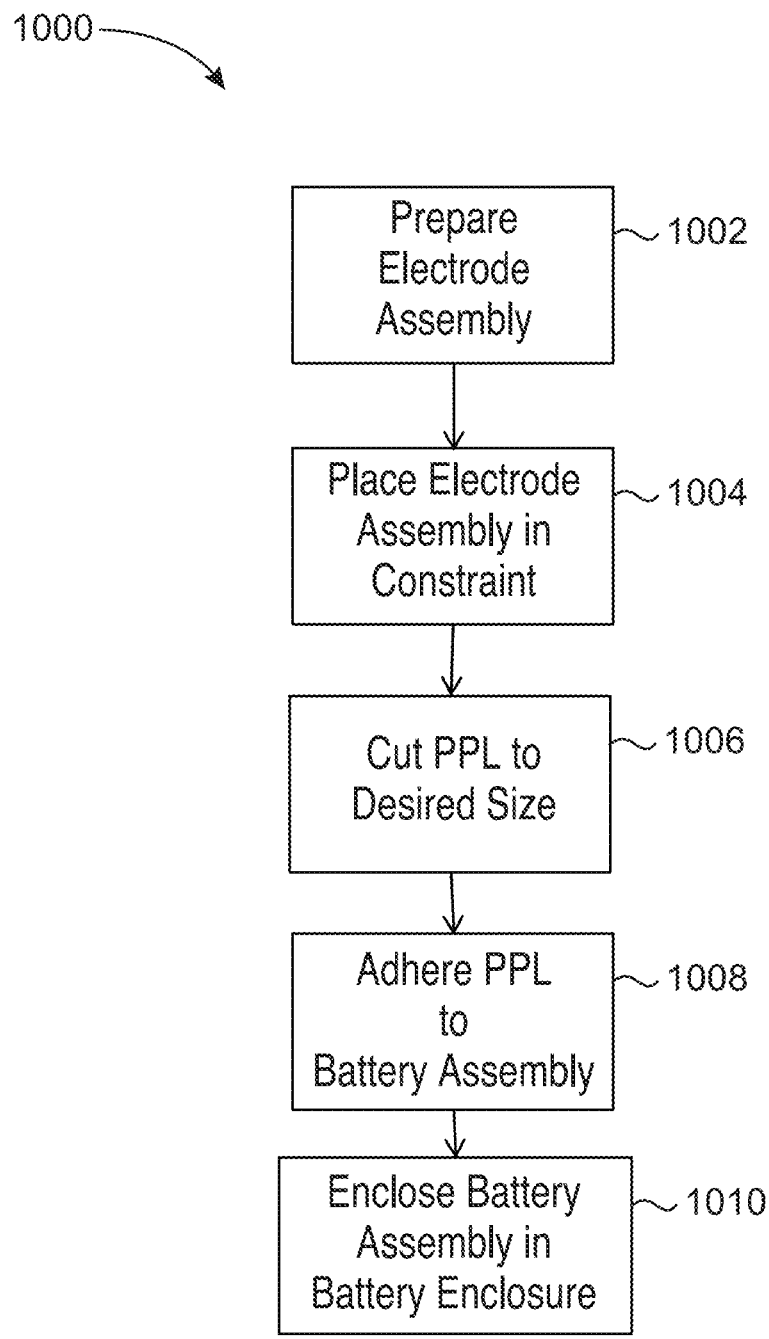
FIG. 10 is a schematic view of a method of preparing a battery assembly including an enclosure protection layer according to the present disclosure.

In one embodiment, the height $PL_H$ is substantially equal to the height $B_H$ of the face of battery assembly 400 the PPL 450 is applied to. However, in other embodiments, the height $PL_H$ may be less than the height $B_H$ of the face of the battery assembly 400 it is applied to. However, typically the height $PL_H$ should be sufficient height to cover any potential puncture points on such face. In still another embodiment, the height $PL_H$, prior to application to battery assembly 400, is greater than the height $B_H$ of the face of the battery assembly 400 to which it is to be applied. In this embodiment, distal edges 801, 802 (FIG. 8) of PPL 450 may wrap over and be in contact with an additional face of battery assembly 400. For example, in one embodiment, PPL 450 may be adhered to face $F_1$ as described above, but then distal edges 801, 802 are wrapped or folded over such that they are adhered to at least a portion of faces $F_5$ and $F_6$ respectively (FIG. 9).

Figure 5:
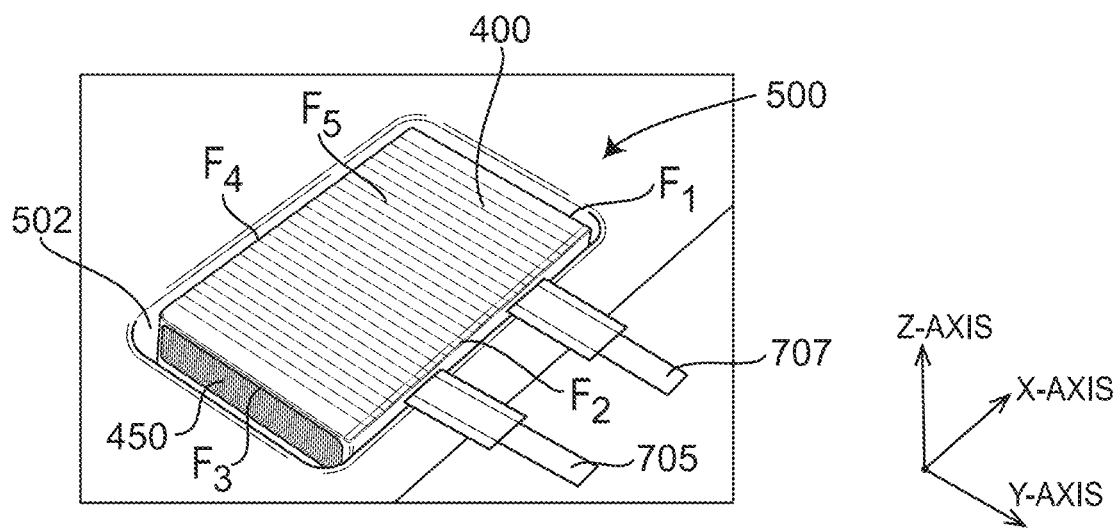
FIG. 5 is a perspective view of a battery assembly placed partially within a battery enclosure.
Figure 6:
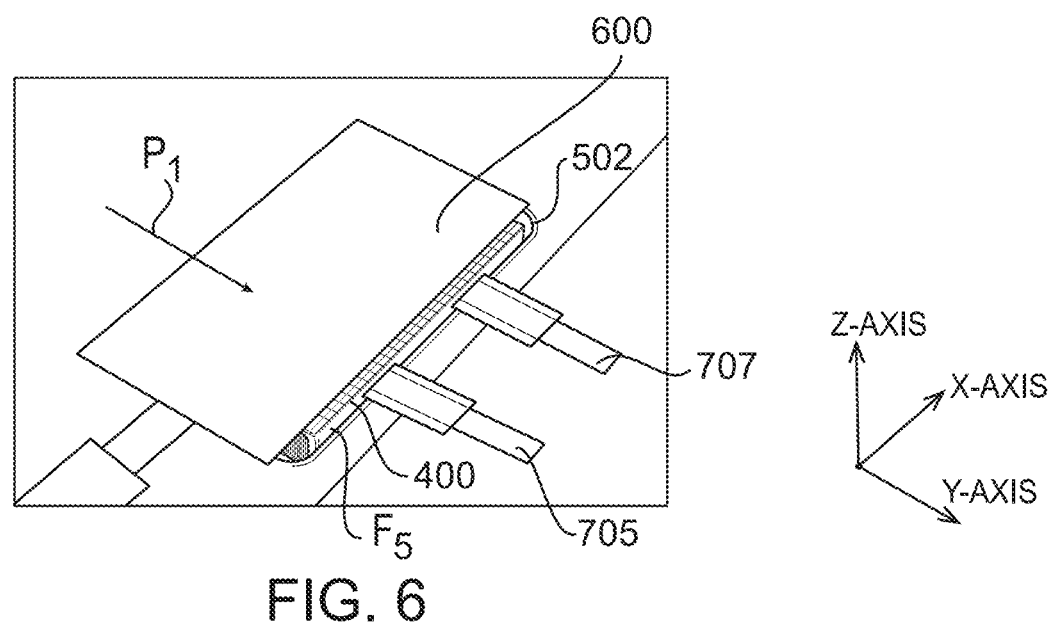
FIG. 6 is a perspective view of the battery assembly of FIG. 5 including a second cover of the battery enclosure.
Figure 7:
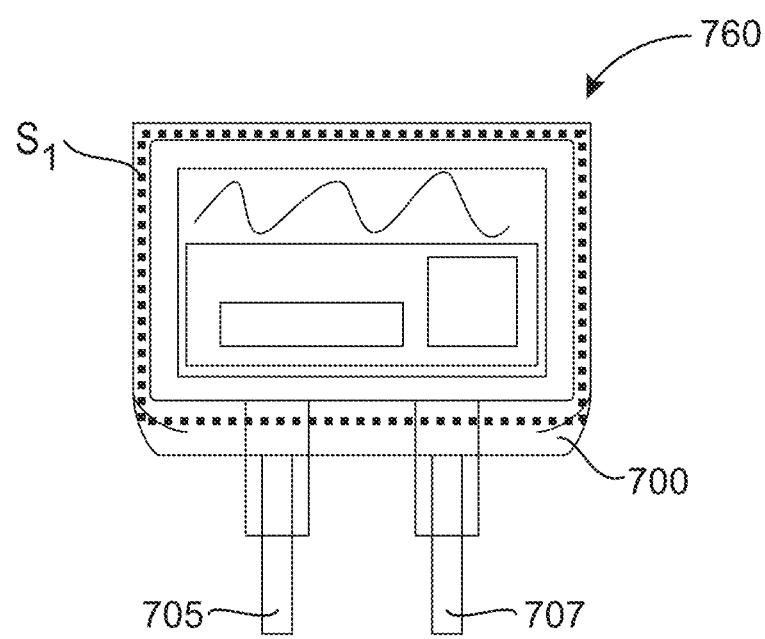
FIG. 7 is a profile view of a completed battery after being sealed within the battery enclosure.

Reference is now made to FIGS. 5-7. Subsequent to the application of the PPL 450, the battery assembly 400 is placed within a battery package 700 to form a complete battery 760. In embodiments, the battery package comprises a first enclosure layer 500 and a second enclosure layer 600. Each of the first and second enclosure layers may comprise a flexible or semi-flexible material, such as aluminum, polymer or the like. In one embodiment, one or more of the first and second enclosure layers 500, 600 comprises a multi-layer aluminum polymer material, plastic, or the like. In one embodiment, one or more of the first and second enclosure layers 500, 600 comprises a polymer material laminated on a metal substrate, such as aluminum.

In the embodiment illustrated in FIG. 5, the battery assembly 400 is placed on the first enclosure layer 500, such that the major face $F_6$ of constraint 316 is in contact with the first enclosure layer 500. In one embodiment, the battery assembly 400 is placed within a recess 502 formed within the first enclosure layer 500. The recess 502 is sized and shaped to match the outer surface size and shape of the battery assembly 400. In one embodiment, second enclosure layer 600 is placed over battery assembly 400, such that major face $F_5$ of constraint 316 is in contact with second enclosure layer 600. The second enclosure layer 600 may be positioned (such as by movement in the placement direction $P_1$) so as to cover the entirety of the major face $F_5$ and recess 502. Conductive terminals 705 and 707 remain uncovered by first and second enclosure protective layers 500, 600. After proper placement of the second enclosure protective layer 600, the first and second enclosure protective layers 500, 600 are sealed along sealing edge $S_1$ (denoted by the dotted line in FIG. 7). In one embodiment, excess material of first and second enclosure protective layers 500, 600 may be trimmed prior to, or subsequently to, sealing. The first and second enclosure protective layers 500, 600 may be sealed along sealing edge $S_1$ by welding, heat sealing, adhesive, combinations thereof, or the like. In another embodiment, the first and second enclosure protective layers 500, 600 may be sealed along three sides of sealing edge $S_1$ creating a pocket therein. In such embodiment, the battery assembly 400 may be placed within the pocket, and the final edge of sealing edge $S_1$ is subsequently sealed. In one embodiment, the sealing edge $S_1$ is sealed using a hot press, that applies a controlled temperature and pressure to the sealing edge $S_1$ causing the first and second enclosure layers 500, 600 to adhere or fuse together along sealing edge $S_1$. In another embodiment, a vacuum is applied to the battery assembly 400 during the sealing process to evacuate any excess volume occupied by air or other gas. The time for which the sealing edge is subject to the hot press may be controlled and is dependent upon the materials selected for the first and second enclosure layers 500, 600. Once sealed over battery assembly 400, the sealed first and second enclosure layers 500, 600 form battery package 700. Upon sealing, battery package 700 is liquid tight and/or air tight, depending on the desired application. The terminals 705, 707 remain exposed, and are not covered by battery package 700 to allow a user to connect the terminals to a device to be powered, or to a battery charger.

Methods of the present disclosure (e.g., method 1000 shown in FIG. 10) are described with reference to FIGS. 1-10. Initially, at 1002, a battery assembly, such as battery assembly 400 is provided, including a prepared electrode assembly. At 1004, a constraint, such as constraint 316 is provided over the electrode assembly, as described herein above. The electrode assembly and the constraint, together define one or more puncture points. To facilitate a reduction or elimination in the possibility of the puncture points causing a rupture or puncture of the outer casing, an enclosure protection layer 450 is provided over the puncture point(s). In one embodiment, an enclosure protection layer (PPL) 450 is disposed/adhered over at least a portion of the perimeter of battery assembly 400 (as traveled along the X and Y axes). Battery assembly 400 may be the same or similar to battery assembly 300. Prior to application to the perimeter of the battery assembly 400, the PPL 450 may be in the form of an elongated web or tape, having a length and height $PL_H$ significantly larger than its width $PL_W$.

In one embodiment, the PPL 450 is applied to at least two of the minor surfaces $F_1$ and $F_2$ in a manner such that the PPL 450 covers substantially the entirety of minor surfaces $F_1$ and $F_2$ in the Y-axis and Z-axis directions. The PPL 450 may be applied manually or using automated machinery. In one embodiment, the PPL 450 may be applied in a fashion to cover the flap edges 330 and 332 of the constraint.

In embodiments, the PPL 450 may be applied to one or more of the faces $F_{1-6}$ of the battery assembly 400 to desirably cover any puncture point(s). For example, with reference to FIGS. 4E and 4F, it is illustrated that the PPL 450 is applied in a manner such that it covers, and thus increases the radius of curvature over puncture points $PP_{1-X}$. By covering the puncture points with PPL 450, as illustrated in FIG. 4F, a radius of curvature over the puncture points may be effectively increased, thus reducing the pressure exerted by the puncture point against the enclosure (e.g., enclosure layers 500, 600), and thus facilitating a reduction or elimination of punctures to the enclosure. For example, a series of puncture points $PP_1$-$PP_X$, which may be corners of bus bars 110, 112, current collector tabs 120, edges of constraint 316 or the like.

In one embodiment, the method 1000 involves using a PPL 450 that is initially in the form of an elongated web having a height $PL_H$ a thickness $t_2$ and a length $PL_L$ (FIG. 8). In this embodiment, prior to application of the PPL 450 to one or more faces $F_{1-6}$ of battery assembly 400, the PPL 450 may be cut at 1006 by any suitable means, such as using a mechanical device (e.g., knife), laser, waterjet or the like, to a desired length and/or height in order to cover a desired portion of the faces $F_{1-6}$. For example, in one embodiment, PPL 450 is cut to a length $PL_L$ that is substantially the same as the length of face $F_1$ in the Y-axis direction. After cutting, at 1008, the PPL 450 is placed on face $F_1$ and adhered to face $F_1$ using one or more of heat, pressure and time. In one suitable embodiment, use of heat staking equipment is utilized to heat stake the PPL 450 to desired locations along face $F_1$. In one embodiment, the PPL 450 is heat staked to at least 80% or more of the length of face $F_1$. However, in other embodiments, PPL 450 may be heat staked to any amount, such as from 1% to 100% of the length of face $F_1$. In yet other embodiments, the PPL 450 is heat staked at one or more discrete points along the length of face $F_1$. In some embodiments, depending on the material comprising the PPL 450, the PPL 450 may be heat staked, or otherwise adhered to, face $F_1$ without the use of any additional adhesive. However, in other embodiments, an adhesive layer is used between face $F_1$ and PPL 450 to adhere PPL 450 to face $F_L$ In a similar manner, the PPL 450 may be cut and adhered to any or all of faces $F_{1-6}$ using the same or similar process. In yet another embodiment, the PPL 450 is cut to a length equal to the sum of the lengths of faces $F_{1-4}$ (e.g., a circumference of the battery assembly 400), and the PPL 450 is then wrapped around the circumference (e.g., each of faces $F_{1-4}$) and then adhered to such faces. In yet another embodiment, the PPL 450 comprises a stretchable material and is cut to a length less than equal to the sum of the lengths of faces $F_{1-4}$ (e.g., a circumference of the battery assembly 400), and the PPL 450 is then stretched and wrapped around the circumference (e.g., each of faces $F_{1-4}$) and then adhered to such faces.

In one embodiment of the method 1000, the height $PL_H$ is substantially equal to the height $B_H$ of the face of battery assembly 400 the PPL 450 is applied to. However, in other embodiments, the height $PL_H$ may be less than the height $B_H$ of the face of the battery assembly 400 it is applied to. However, typically the height $PL_H$ should be sufficient height to cover any potential puncture points on such face. In still another embodiment, the height $PL_H$, prior to application to battery assembly 400, is greater than the height $B_H$ of the face of the battery assembly 400 to which it is to be applied. In this embodiment, distal edges 801, 802 (FIG. 8)

of PPL 450 may be wrapped over to be in contact with an additional face of battery assembly 400. For example, in one embodiment, PPL 450 is adhered to face $F_1$ as described above, but then distal edges 801, 802 are wrapped or folded over such that they are adhered to at least a portion of faces $F_5$ and $F_6$ respectively (FIG. 9).

Subsequent to the application of the PPL 450, at 1010, the battery assembly 400 is placed within a battery package 700 (e.g., a battery enclosure) to form a complete battery 760. In embodiments, the battery package 700 comprises a first enclosure layer 500 and a second enclosure layer 600. Each of the first and second enclosure layers may comprise a flexible or semi-flexible material, such as aluminum, polymer or the like. In one embodiment, one or more of the first and second enclosure layers 500, 600 comprises a multi-layer aluminum polymer material, plastic, or the like.

In one embodiment of the method 1000, the battery assembly 400 is placed on the first enclosure layer 500, such that the major face $F_6$ of constraint 316 is in contact with the first enclosure layer 500. In one embodiment, the battery assembly 400 is placed within a recess 502 formed within the first enclosure layer 500. The recess 502 is sized and shaped to match the outer surface size and shape of the battery assembly 400. In one embodiment, second enclosure layer 600 is placed over battery assembly 400, such that major face $F_5$ of constraint 316 is in contact with second enclosure layer 600. The second enclosure layer 600 may be positioned (such as by movement in the placement direction $P_1$) so as to cover the entirety of the major face $F_5$ and recess 502. Conductive terminals 705 and 707 remain uncovered by first and second enclosure protective layers 500, 600. After proper placement of the second enclosure protective layer 600, the first and second enclosure protective layers 500, 600 are sealed along sealing edge $S_1$ (denoted by the dotted line in FIG. 7). In one embodiment, excess material of first and second enclosure protective layers 500, 600 may be trimmed prior to, or subsequently to, sealing.

In one embodiment, the first and second enclosure protective layers are then sealed along sealing edge $S_1$ by welding, heat sealing, adhesive, combinations thereof, or the like. In another embodiment, the first and second enclosure protective layers 500,600 are sealed along three sides of sealing edge $S_1$ creating a pocket therein. In such embodiment, the battery assembly 400 is placed within the pocket, and the final edge of sealing edge $S_1$ is subsequently sealed. Once sealed over battery assembly 400, the sealed first and second enclosure layers 500, 600 define battery package 700. Upon sealing, battery package 700 is liquid tight and/or airtight, depending on the desired application. The terminals 705, 707 remain exposed, and are not covered by battery package 700 to allow a user to connect the terminals to a device to be powered, or to a battery charger.

The following embodiments are provided to illustrate aspects of the disclosure, although the embodiments are not intended to be limiting and other aspects and/or embodiments may also be provided.

Embodiment 1. A secondary battery assembly, comprising: an electrode assembly having mutually perpendicular transverse, longitudinal, and vertical axes corresponding to the X, Y and Z axes, respectively, of a three-dimensional Cartesian coordinate system; a constraint disposed on an outer surface of the electrode assembly; at least one of the electrode assembly or constraint comprising a protrusion extending in an X-Y plane defined by the X and Y axes, the protrusion having a first radius of curvature in the X-Y plane; a battery enclosure enclosing the electrode assembly and constraint; and an enclosure protection layer disposed over at least a portion of the protrusion and between the protrusion and the battery enclosure, the enclosure protection layer defining a second radius of curvature overlying the first radius of curvature in the X-Y plane, the second radius of curvature being greater than the first radius of curvature to thereby reduce the potential of the protrusion causing damage to the battery enclosure.

Embodiment 2. The secondary battery assembly of Embodiment 1, wherein the electrode assembly comprises a rectangular prism shape.

Embodiment 3. The secondary battery assembly of any prior embodiment, wherein the electrode assembly is enclosed within a volume defined by the constraint, and the constraint comprises a first primary growth constraint in contact with at least one surface of an electrode or counter electrode of the electrode assembly, and the first primary growth constraint defines the protrusion.

Embodiment 4. The secondary battery assembly of any prior Embodiment, the constraint further comprising a second primary growth constraint spaced apart from the first primary growth constraint, the second primary growth constraint in contact with a different surface of the electrode or the counter electrode of the electrode assembly.

Embodiment 5. The secondary battery assembly of any prior Embodiment, the constraint further comprising a first secondary growth constraint in contact with a second surface of the electrode or the counter electrode of the electrode assembly.

Embodiment 6. The secondary battery assembly of any prior Embodiment, the constraint further comprising a second secondary growth constraint spaced apart from the first secondary growth constraint, and in contact with a third surface of the electrode or the counter electrode of the electrode assembly.

Embodiment 7. The secondary battery assembly of any prior Embodiment, further comprising a first bus bar and a second bus bar, and wherein a portion of the first bus bar or the second bus bar defines the protrusion.

Embodiment 8. The secondary battery assembly of any prior Embodiment, wherein the enclosure protection layer is disposed over at least one of the first bus bar and the second bus bar.

Embodiment 9. The secondary battery assembly of any prior Embodiment, wherein the enclosure protection layer comprises a polymer.

Embodiment 10. The secondary battery assembly of any prior Embodiment, wherein the polymer comprises at least one of polyvinylidene fluoride (PVDF), polyethylene (PE), ethylene acrylic acid (EAA), ethylene methacrylic acid (EMAA) or functional derivatives or copolymers thereof.

Embodiment 11. The secondary battery assembly of any prior Embodiment, wherein: the electrode assembly comprises a rectangular prismatic shape having six rectangular faces; and the constraint comprises a first cover in contact with at least three of the rectangular faces and a second cover spaced apart from the first cover in contact with at least three other ones of the rectangular faces, and wherein the constraint defines the protrusion.

Embodiment 12. The secondary battery assembly of Embodiment 11, wherein the first cover comprises a population of through bores extending through an entirety of a height dimension of the first cover, and wherein at least a portion of the through bores defines the protrusion.

Embodiment 13. The secondary battery assembly of any prior Embodiment, wherein the second cover comprises a population of through bores extending through an entirety of a height dimension of the second cover, and wherein at least a portion of the through bores of the second cover defines the protrusion.

Embodiment 14. The secondary battery assembly of any prior Embodiment, wherein the enclosure protection layer substantially covers at least two of the rectangular faces.

Embodiment 15. A secondary battery comprising: an electrode assembly having mutually perpendicular transverse, longitudinal, and vertical axes corresponding to the X, Y and Z axes, respectively, of a three-dimensional Cartesian coordinate system; a constraint defining a volume, the electrode assembly contained within the volume; at least one of the electrode assembly or constraint defining at least one protrusion extending in an X-Y plane defined by the X and Y axes, the protrusion having a first radius of curvature in the X-Y plane; an enclosure protection layer disposed over at least a portion of the protrusion and between the protrusion and a battery enclosure, the enclosure protection layer defining a second radius of curvature overlying the first radius of curvature in the X-Y plane, the second radius of curvature being greater than the first radius of curvature to thereby reduce the potential of the protrusion causing damage to the battery enclosure; and wherein the battery enclosure encloses the electrode assembly, constraint and enclosure protection layer, and at least a portion of the battery enclosure is in direct contact with the enclosure protection layer.

Embodiment 16. The secondary battery of Embodiment 15, wherein the enclosure protection layer is heat staked to at least one of the electrode assembly or the constraint.

17. Embodiment The secondary battery of any prior Embodiment, wherein the enclosure protection layer comprises at least one of polyvinylidene fluoride (PVDF), polyethylene (PE), ethylene acrylic acid (EAA), ethylene methacrylic acid (EMAA) or functional derivatives or copolymers thereof.

Embodiment 18. The secondary battery according to any prior Embodiment, wherein the battery enclosure comprises aluminum.

Embodiment 19. The secondary battery according to any prior Embodiment, wherein the electrode assembly is a rectangular prismatic shape having at least six rectangular faces, and the enclosure protection later is disposed over at least four of the rectangular faces.

Embodiment 20. The secondary battery according to any prior Embodiment, wherein the enclosure protection layer has a thickness of from 25 µm to 500 µm.

Embodiment 21. The secondary battery according to any prior Embodiment, wherein a height measured in the Z-axis direction of the enclosure protection layer is substantially equal to a height measured in the Z-axis direction of the electrode assembly.

Embodiment 22. The secondary battery according to any prior Embodiment, wherein the enclosure protection layer is heat staked along at least 80% of a length measured in the x-axis direction of the enclosure protection layer.

Embodiment 23. The secondary battery according to any prior Embodiment, wherein the enclosure protection layer is heat staked along at least 95% of the length measured in the X-axis direction of the enclosure protection layer.

Embodiment 24. The secondary battery of any prior Embodiment, wherein the electrode assembly comprises an anodically active material selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; (g) lithium metal; and (h) combinations thereof.

Embodiment 25. The secondary battery of any prior embodiment, wherein the electrode assembly comprises an anodically active material selected from the group consisting of silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd).

Embodiment 26. The secondary battery of any prior embodiment, wherein the electrode assembly comprises an anodically active material selected from the group consisting of alloys and intermetallic compounds of Si, Ge, Sn, Pb, Sb, Bi, Zn, Al, Ti, Ni, Co, or Cd with other elements.

Embodiment 27. The secondary battery of any prior embodiment, wherein the electrode assembly comprises an anodically active material selected from the group consisting of oxides, carbides, nitrides, sulfides, phosphides, selenides, and tellurides of Si, Ge, Sn, Pb, Sb, Bi, Zn, Al, Ti, Fe, Ni, Co, V, and Cd.

Embodiment 28. The secondary battery of any prior embodiment, wherein the electrode assembly comprises an anodically active material selected from the group consisting of oxides, carbides, nitrides, sulfides, phosphides, selenides, and tellurides of Si.

Embodiment 29. The secondary battery of any prior embodiment, wherein the electrode assembly comprises an anodically active material selected from the group consisting of silicon and the oxides and carbides of silicon.

Embodiment 30. The secondary battery of any prior embodiment, wherein the electrode assembly comprises an anodically active material comprising lithium metal.

Embodiment 31. The secondary battery of any prior embodiment, wherein the electrode assembly comprises an anodically active material selected from the group consisting of graphite and carbon.

Embodiment 32. The secondary battery of any prior embodiment, wherein within the enclosure the secondary battery further comprises a non-aqueous, organic electrolyte.

Embodiment 33. The secondary battery of any prior embodiment, wherein within the enclosure the secondary battery further comprises a non-aqueous electrolyte comprising a mixture of a lithium salt and an organic solvent.

Embodiment 34. The secondary battery of any prior embodiment, wherein within the enclosure the secondary battery further comprises a polymer electrolyte.

Embodiment 35. The secondary battery of any prior embodiment, wherein within the enclosure the secondary battery further comprises a solid electrolyte.

Embodiment 36. The secondary battery of any prior embodiment, wherein within the enclosure the secondary battery further comprises a solid electrolyte selected from the group consisting of sulfide-based electrolytes.

Embodiment 37. The secondary battery of any prior embodiment, wherein within the enclosure the secondary battery further comprises a solid electrolyte selected from the group consisting of lithium tin phosphorus sulfide ($Li_{10}SnP_2S_{12}$), lithium phosphorus sulfide ($\beta$-$Li_3PS_4$) and lithium phosphorus sulfur chloride iodide ($Li_6PS_5Cl_{0.9}I_{0.1}$).

Embodiment 38. The secondary battery of any prior embodiment, wherein within the enclosure the secondary battery further comprises a polymer based electrolyte.

Embodiment 39. The secondary battery of any prior embodiment, wherein within the enclosure the secondary battery further comprises a polymer electrolyte selected from the group consisting of PEO-based polymer electrolyte, polymer-ceramic composite electrolyte (solid), polymer-ceramic composite electrolyte, and polymer-ceramic composite electrolyte.

Embodiment 40. The secondary battery of any prior embodiment, wherein within the enclosure the secondary battery further comprises a solid electrolyte selected from the group consisting of oxide based electrolytes.

Embodiment 41. The secondary battery of any prior embodiment, wherein within the enclosure the secondary battery further comprises a solid electrolyte selected from the group consisting of lithium lanthanum titanate ($Li_{0.34}La_{0.56}TiO_3$), Al-doped lithium lanthanum zirconate ($Li_{6.4}La_3Zr_2Al_{0.24}O_{11.98}$), Ta-doped lithium lanthanum zirconate ($Li_{6.4}La_3Zr_{1.4}Ta_{0.6}O_{12}$) and lithium aluminum titanium phosphate ($Li_{1.4}Al_{0.4}Ti_{1.6}(PO_4)_3$).

Embodiment 42. The secondary battery of any prior embodiment, wherein one of electrode active material and counter-electrode material of the electrode assembly is a cathodically active material selected from the group consisting of intercalation chemistry positive electrodes and conversion chemistry positive electrodes.

Embodiment 43. The secondary battery of any prior embodiment, wherein one of electrode active material and counter-electrode material of the electrode assembly is a cathodically active material comprising an intercalation chemistry positive electrode material.

Embodiment 44. The secondary battery of any prior embodiment, wherein one of electrode active material and counter-electrode material of the electrode assembly is a cathodically active material comprising a conversion chemistry positive electrode active material.

Embodiment 45. The secondary battery of any prior embodiment, wherein one of electrode active material and counter-electrode material of the electrode assembly is a cathodically active material selected from the group consisting of S (or $Li_2S$ in the lithiated state), LiF, Fe, Cu, Ni, $FeF_2$, $FeO_dF_{3-2d}$, $FeF_3$, $CoF_3$, $CoF_2$, $CuF_2$, $NiF_2$, where $0 \leq d \leq 0.5$.

Embodiment 46. A method of preparing a battery assembly for use with a secondary battery, the method comprising: preparing an electrode assembly having mutually perpendicular transverse, longitudinal, and vertical axes corresponding to the X, Y and Z axes, respectively, of a three-dimensional Cartesian coordinate system; placing the electrode assembly within a volume defined by a constraint, such that the constraint is disposed over an outer surface of the electrode assembly; wherein at least one of the electrode assembly or constraint define at least one protrusion extending in an X-Y plane defined by the X and Y axes, the protrusion having a first radius of curvature in the X-Y plane; adhering an enclosure protection layer over at least a portion of the protrusion, the enclosure protection layer defining a second radius of curvature overlying the first radius of curvature in the X-Y plane, the second radius of curvature being greater than the first radius of curvature to thereby reduce the potential of the protrusion causing damage to a battery enclosure; and enclosing the electrode assembly, constraint and enclosure protection layer within the battery enclosure, such that the enclosure protection layer is disposed between the constraint and the battery enclosure.

Embodiment 47. The method according to Embodiment 46, wherein the adhering comprises applying heat to the enclosure protection layer.

Embodiment 48. The method according to Embodiment 47, wherein the adhering the enclosure protection layer over the at least one protrusion comprises increasing a radius over at least one potential puncture point of the protrusion.

Embodiment 49. The method according to any prior Embodiment, wherein the adhering the enclosure protection layer over the at least one protrusion comprises stretching the enclosure protection layer over at least four faces of the electrode assembly.

Embodiment 50. A method of manufacturing a secondary battery, comprising: preparing an electrode assembly having mutually perpendicular transverse, longitudinal, and vertical axes corresponding to the X, Y and Z axes, respectively, of a three-dimensional Cartesian coordinate system; placing the electrode assembly within a volume defined by a constraint, such that the constraint is disposed over an outer surface of the electrode assembly; wherein at least one of the electrode assembly or the constraint define at least one protrusion extending in an X-Y plane defined by the X and Y axes, the protrusion having a first radius of curvature in the X-Y plane; adhering an enclosure protection layer over at least a portion of the at least one protrusion, the enclosure protection layer defining a second radius of curvature overlying the first radius of curvature in the X-Y plane, the second radius of curvature being greater than the first radius of curvature to thereby reduce the potential of the protrusion causing damage to a battery enclosure; enclosing the electrode assembly, constraint and enclosure protection layer within the battery enclosure, such that the enclosure protection layer is disposed between the constraint and the battery enclosure; and vacuum sealing the battery enclosure.

Embodiment 51. The method according to Embodiment 50, wherein the enclosure protection layer comprises at least one of polyvinylidene fluoride (PVDF), polyethylene (PE), ethylene acrylic acid (EAA), ethylene methacrylic acid (EMAA) or functional derivatives or copolymers thereof, and the adhering comprises applying heat to the enclosure protection layer.

Embodiment 52. The method according to any prior Embodiment, wherein the adhering comprises heat staking the enclosure protection layer along at least 80% of a length measured in the X-axis direction of the enclosure protection layer.

Embodiment 53. The method according to any prior Embodiment, wherein the adhering comprises applying a heat and a pressure to the enclosure protection layer.

Embodiment 54. A secondary battery comprising: an electrode assembly having mutually perpendicular transverse, longitudinal, and vertical axes corresponding to the X, Y and Z axes, respectively, of a three-dimensional Cartesian coordinate system, the electrode assembly comprising a population of unit cells, an electrode bus bar, and a counter-electrode bus bar, wherein the members of the unit cell population comprise an electrode structure, a separator structure, and a counter-electrode structure, wherein (a) the electrode structures comprise an electrode active material layer, an electrode current collector, and (b) the counter-electrode current collectors comprise a counter-electrode active material layer, a counter-electrode current collector and the electrode structures are electrically connected, in parallel, to the electrode bus bar via the electrode current collector and the counter-electrode structures are electrically connected, in parallel, to the counter-electrode bus bar via the counter-electrode current collector, a constraint defining a volume, the electrode assembly contained within the volume; at least one of the electrode assembly or constraint defining at least one protrusion extending in an X-Y plane defined by the X and Y axes, the protrusion having a first radius of curvature in the X-Y plane; an enclosure protection layer disposed over at least a portion of the protrusion and between the protrusion and the battery enclosure, the enclosure protection layer defining a second radius of curvature overlying the first radius of curvature in the X-Y plane, the second radius of curvature being greater than the first radius of curvature to thereby reduce the potential of the protrusion causing damage to a battery enclosure; and wherein the battery enclosure encloses the electrode assembly, constraint and enclosure protection layer, and at least a portion of the battery enclosure is in direct contact with the enclosure protection layer.

Embodiment 55. The electrode assembly of Embodiment 54 wherein the electrode assembly has a first longitudinal end surface and a second longitudinal end surface separated from each other in the longitudinal direction, and a lateral surface surrounding an electrode assembly longitudinal axis and connecting the first and second longitudinal end surfaces, the population of unit cells being stacked in series in the longitudinal direction.

Embodiment 56. The electrode assembly of any previous Embodiment wherein the electrode assembly has a prismatic shape.

Embodiment 57. The electrode assembly of any previous Embodiment wherein the constraint comprises (i) first and second primary growth constraints separated in the longitudinal direction, and (ii) first and second secondary growth constraints separated in the vertical direction and connecting the first and second primary growth constraints, wherein (iii) the first secondary growth constraint is further connected to upper end surfaces of the electrode or counter-electrode structures of a subset of the unit cell population, and (iv) the second secondary growth constraint is further connected to lower end surfaces of the electrode or counter-electrode structures of a subset of the unit cell population.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A secondary battery assembly, comprising:
    an electrode assembly having mutually perpendicular transverse, longitudinal, and vertical axes corresponding to an X axis, a Y axis, and a Z axis, respectively, of a three-dimensional Cartesian coordinate system;
    a constraint disposed on an outer surface of the electrode assembly;
    at least one of (i) the electrode assembly and (i) the constraint, comprising a protrusion extending in an X-Y plane defined by the X axis and the Y axis, the protrusion having a first radius of curvature in the X-Y plane;
    a battery enclosure enclosing the electrode assembly and the constraint; and
    an enclosure protection layer disposed over at least a portion of the protrusion and between the protrusion and the battery enclosure, the enclosure protection layer defining a second radius of curvature overlying the first radius of curvature in the X-Y plane, the second radius of curvature being greater than the first radius of curvature, to thereby reduce a potential of the protrusion to cause damage to the battery enclosure.

2. The secondary battery assembly of claim 1, wherein the electrode assembly comprises a rectangular prismatic shape having six rectangular faces, and wherein the protrusion is located on one of the rectangular faces.

3. The secondary battery assembly of claim 1, wherein the electrode assembly is enclosed within a volume defined by the constraint, and the constraint comprises a first primary growth constraint in contact with at least one surface (a) of an electrode and/or (b) of a counter electrode, of the electrode assembly, and wherein the first primary growth constraint defines the protrusion, the electrode assembly comprising the electrode and the counter electrode.

4. The secondary battery assembly of claim 3, wherein the constraint further comprises a second primary growth constraint spaced apart from the first primary growth constraint, the second primary growth constraint being in contact with a different surface of the electrode or of the counter electrode.

5. The secondary battery assembly of claim 3, wherein the constraint further comprises a first secondary growth constraint in contact with a second surface of the electrode and/or of the counter electrode.

6. The secondary battery assembly of claim 5, wherein the constraint further comprises a second secondary growth constraint being (a) spaced apart from the first secondary growth constraint, and (b) in contact with a third surface of the electrode and/or of the counter electrode.

7. The secondary battery assembly of claim 1, further comprising a first bus bar and a second bus bar, and wherein a portion of the first bus bar or of the second bus bar, defines the protrusion.

8. The secondary battery assembly of claim 7, wherein the enclosure protection layer is disposed over at least one of (a) the first bus bar and (b) the second bus bar.

9. The secondary battery assembly of claim 1, wherein the enclosure protection layer comprises a polymer.

10. The secondary battery assembly of claim 9, wherein the polymer comprises at least one of polyvinylidene fluoride (PVDF), polyethylene (PE), ethylene acrylic acid (EAA), ethylene methacrylic acid (EMAA), functional derivatives, and copolymers thereof.

11. The secondary battery assembly of claim 1, wherein:
    the electrode assembly comprises a rectangular prismatic shape having six rectangular faces; and
    the constraint comprises (A) a first cover in contact with at least three of the rectangular faces and (B) a second cover spaced apart from the first cover, the second cover being in contact with at least three other ones of the rectangular faces, and wherein the constraint defines the protrusion.

12. The secondary battery assembly of claim 11, wherein the first cover comprises a population of through bores extending through an entirety of a height dimension of the first cover, and wherein at least a portion of the through bores defines the protrusion.

13. The secondary battery assembly of claim 11, wherein the second cover comprises a population of through bores extending through an entirety of a height dimension of the second cover, and wherein at least a portion of the through bores of the second cover defines the protrusion.

14. The secondary battery assembly of claim 11, wherein the enclosure protection layer substantially covers at least two of the rectangular faces.

15. The secondary battery assembly of claim 1, wherein the enclosure protection layer has a uniform thickness.

16. A secondary battery comprising:
an electrode assembly having mutually perpendicular transverse, longitudinal, and vertical axes corresponding to an X axis, a Y axis and a Z axis, respectively, of a three-dimensional Cartesian coordinate system;
a constraint defining a volume, the electrode assembly contained within the volume;
at least one of (a) electrode assembly and (b) the constraint, defining at least one protrusion extending in an X-Y plane defined by the X axis and Y axis, the protrusion having a first radius of curvature in the X-Y plane;
an enclosure protection layer disposed over at least a portion of the protrusion and between the protrusion and a battery enclosure, the enclosure protection layer defining a second radius of curvature overlying the first radius of curvature in the X-Y plane, the second radius of curvature being greater than the first radius of curvature to thereby reduce a potential of the protrusion to cause damage to the battery enclosure; and
wherein the battery enclosure encloses the electrode assembly, constraint and enclosure protection layer, and at least a portion of the battery enclosure is in direct contact with the enclosure protection layer.

17. The secondary battery of claim 16, wherein the enclosure protection layer is heat staked to at least one of (a) the electrode assembly and (b) the constraint.

18. The secondary battery of claim 16, wherein the enclosure protection layer comprises at least one of polyvinylidene fluoride (PVDF), polyethylene (PE), ethylene acrylic acid (EAA), ethylene methacrylic acid (EMAA), functional derivatives, and copolymers thereof.

19. The secondary battery of claim 16, wherein the battery enclosure comprises aluminum.

20. The secondary battery of claim 16, wherein the electrode assembly is a rectangular prismatic shape having at least six rectangular faces, and the enclosure protection layer is disposed over at least four of the rectangular faces.

21. The secondary battery of claim 16, wherein the enclosure protection layer has a thickness of from 25 micrometers (μm) to 500 μm.

22. The secondary battery of claim 16, wherein a height measured in a direction of the Z axis of the enclosure protection layer is substantially equal to a height measured in the direction of the Z axis of the electrode assembly.

23. The secondary battery of claim 16, wherein the enclosure protection layer is heat staked along at least 80% of a length measured in a direction of the X axis of the enclosure protection layer.

24. The secondary battery of claim 23, wherein the enclosure protection layer is heat staked along at least 95% of the length measured in the direction of the X axis of the enclosure protection layer.

25. The secondary battery of claim 16, wherein the electrode assembly comprises an anodically active material selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, Cd, the alloys or intermetallic compounds being with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, their mixtures, their composites, lithium-containing composites; (d) salts of Sn, hydroxides of Sn; (e) lithium titanate, lithium manganate, lithium aluminate, lithium-containing titanium oxide, lithium transition metal oxide, $ZnCo_2O_4$; (f) particles of graphite, particles of carbon; (g) lithium metal; and (h) combinations thereof.

\* \* \* \* \*

UNITED STATES PATENT AND TRADEMARK OFFICE
CERTIFICATE OF CORRECTION

| | |
|---|---|
| PATENT NO. | : 12,355,088 B2 |
| APPLICATION NO. | : 17/705512 |
| DATED | : July 8, 2025 |
| INVENTOR(S) | : Busacca et al. |

It is certified that error appears in the above-identified patent and that said Letters Patent is hereby corrected as shown below:

In the Claims

In Claim 16, Column 31, Line 16, insert --the-- before phrase "electrode assembly" and after "(a)".

Signed and Sealed this
Twelfth Day of August, 2025

Coke Morgan Stewart
*Acting Director of the United States Patent and Trademark Office*